(12) United States Patent
Thomas et al.

(10) Patent No.: US 7,111,798 B2
(45) Date of Patent: Sep. 26, 2006

(54) SHOWER HEAD ASSEMBLY

(76) Inventors: Gary J. Thomas, 45694 County Road 13, Fort Collins, CO (US) 80524; Russell S. Krajec, 2249 Weld County Road 46, Berthoud, CO (US) 80513; William J. Gillette, 602 Langdale Dr., Fort Collins, CO (US) 80526; Timothy A. Bachman, 1712 Yorkshire Ave., St. Paul, MN (US) 55116

(*) Notice: Subject to any disclaimer, the term of this patent is extended or adjusted under 35 U.S.C. 154(b) by 0 days.

(21) Appl. No.: 10/658,051

(22) Filed: Sep. 9, 2003

(65) Prior Publication Data

US 2004/0074993 A1 Apr. 22, 2004

Related U.S. Application Data

(63) Continuation of application No. 10/021,852, filed on Dec. 12, 2001, now Pat. No. 6,641,057.
(60) Provisional application No. 60/255,369, filed on Dec. 12, 2000, now abandoned.

(51) Int. Cl.
*B05B 9/01* (2006.01)

(52) U.S. Cl. .................... 239/548; 239/525; 239/590.5; 239/114; 239/DIG. 12

(58) Field of Classification Search .............. 239/590.5, 239/114, 548, DIG. 12
See application file for complete search history.

(56) References Cited

U.S. PATENT DOCUMENTS

| 203,094 A | 4/1878 | Wakeman |
|---|---|---|
| 204,333 A | 5/1878 | Josias |
| 309,349 A | 12/1884 | Hart |
| 428,023 A | 5/1890 | Schoff |
| 445,250 A | 1/1891 | Lawless |
| 486,986 A | 11/1892 | Schinke |
| 570,405 A | 4/1896 | Jerguson et al. |
| 566,384 A | 8/1896 | Engelhart |
| 566,410 A | 8/1896 | Schinke |
| 694,888 A | 3/1902 | Pfluger |
| 800,802 A | 10/1905 | Franquist |

(Continued)

FOREIGN PATENT DOCUMENTS

| CA | 659510 | 3/1963 |
|---|---|---|
| CH | 234284 | 3/1963 |
| DE | 352813 | 5/1922 |
| DE | 848627 | 9/1952 |
| DE | 854100 | 10/1952 |
| DE | 2360534 | 6/1974 |
| DE | 2806093 | 8/1979 |
| DE | 3107808 | 9/1982 |
| DE | 3246327 A1 | 6/1984 |
| DE | 3440901 | 7/1985 |
| DE | 4034695 A1 | 5/1991 |

(Continued)

OTHER PUBLICATIONS

Color Copy, Labeled 1A, Gemlo, available at least as early as Dec. 12, 2000.
Color Copy, Labeled 1B, Gemlo, available at least as early as Dec. 12, 2000.

*Primary Examiner*—David A. Scherbel
*Assistant Examiner*—James S. Hogan

(57) ABSTRACT

A shower head having a plurality of nozzles capable of attachment to a flexible shower arm. The shower head has a unique nozzle construction that allows for the manipulation of an external flexible nozzle to remove mineral deposits and has an internal, rigid nozzle structure for efficiently forming an aesthetically pleasing water stream. The shower head may have two available flow configurations which are selectable by a valve.

9 Claims, 12 Drawing Sheets

U.S. PATENT DOCUMENTS

| | | |
|---|---|---|
| 832,523 A | 10/1906 | Andersson |
| 835,678 A | 11/1906 | Hammond |
| 854,094 A | 5/1907 | Klein |
| 926,929 A | 7/1909 | Dusseau |
| 1,001,842 A | 8/1911 | Greenfield |
| 1,003,037 A | 9/1911 | Crowe |
| 1,018,143 A | 2/1912 | Vissering |
| 1,046,573 A | 12/1912 | Ellis |
| 1,203,466 A | 10/1916 | Benson |
| 1,217,254 A | 2/1917 | Winslow |
| 1,218,895 A | 3/1917 | Porter |
| 1,255,577 A | 2/1918 | Berry |
| 1,260,181 A | 3/1918 | Gamero |
| 1,276,117 A | 8/1918 | Riebe |
| 1,327,428 A | 1/1920 | Gregory |
| 1,451,800 A | 4/1923 | Agner |
| 1,459,582 A | 6/1923 | Dubee |
| 1,469,528 A | 10/1923 | Owens |
| 1,500,921 A | 7/1924 | Bramson et al. |
| 1,560,789 A | 11/1925 | Johnson et al. |
| 1,597,477 A | 8/1926 | Panhorst |
| 1,633,531 A | 6/1927 | Keller |
| 1,692,394 A | 11/1928 | Sundh |
| 1,695,263 A | 12/1928 | Jacques |
| 1,724,147 A | 8/1929 | Russell |
| 1,724,161 A | 8/1929 | Wuesthoff |
| 1,736,160 A | 11/1929 | Jonsson |
| 1,754,127 A | 4/1930 | Srulowitz |
| 1,758,115 A | 5/1930 | Kelly |
| 1,778,658 A | 10/1930 | Baker |
| 1,821,274 A | 9/1931 | Plummer |
| 1,890,156 A | 12/1932 | Konig |
| 1,906,575 A | 5/1933 | Goeriz |
| 2,011,446 A | 8/1935 | Judell |
| 2,024,930 A | 12/1935 | Judell |
| 2,044,445 A | 6/1936 | Price et al. |
| 2,117,152 A | 5/1938 | Crosti |
| 2,196,783 A | 4/1940 | Shook |
| 2,197,667 A | 4/1940 | Shook |
| 2,216,149 A | 10/1940 | Weiss |
| D126,433 S | 4/1941 | Enthof |
| 2,251,192 A | 7/1941 | Krumsiek et al. |
| 2,268,263 A | 12/1941 | Newell et al. |
| 2,342,757 A | 2/1944 | Roser |
| 2,402,741 A | 6/1946 | Draviner |
| D147,258 S | 8/1947 | Becker |
| D152,584 S | 2/1949 | Becker |
| 2,467,954 A | 4/1949 | Becker |
| 2,546,348 A | 3/1951 | Schuman |
| 2,567,642 A | 9/1951 | Henshaw |
| 2,581,129 A | 1/1952 | Muldoon |
| D166,073 S | 3/1952 | Dunkelberger |
| 2,648,762 A | 8/1953 | Dunkelberger |
| 2,664,271 A | 12/1953 | Arutunoff |
| 2,671,693 A | 3/1954 | Hyser et al. |
| 2,676,806 A | 4/1954 | Bachman |
| 2,679,575 A | 5/1954 | Haberstump |
| 2,680,358 A | 6/1954 | Zublin |
| 2,726,120 A | 12/1955 | Bketcher et al. |
| 2,759,765 A | 8/1956 | Pawley |
| 2,776,168 A | 1/1957 | Schweda |
| 2,873,999 A | 2/1959 | Webb |
| 2,931,672 A | 4/1960 | Merritt et al. |
| 2,935,265 A | 5/1960 | Richter |
| 2,966,311 A | 12/1960 | Davis |
| D190,295 S | 5/1961 | Becker |
| 3,007,648 A | 11/1961 | Fraser |
| D192,935 S | 5/1962 | Becker |
| 3,032,357 A | 5/1962 | Shames et al. |
| 3,034,809 A | 5/1962 | Greenberg |
| 3,037,799 A | 6/1962 | Mulac |
| 3,092,333 A | 6/1963 | Gaiotto |
| 3,098,508 A | 7/1963 | Gerdes |
| 3,103,723 A | 9/1963 | Becker |
| 3,104,827 A | 9/1963 | Aghnides |
| 3,111,277 A | 11/1963 | Grimsley |
| 3,143,857 A | 8/1964 | Eaton |
| 3,196,463 A | 7/1965 | Farneth |
| 3,239,152 A | 3/1966 | Bachli et al. |
| 3,266,059 A | 8/1966 | Stelle |
| 3,306,634 A | 2/1967 | Groves et al. |
| 3,329,967 A | 7/1967 | Martinez et al. |
| 3,341,132 A | 9/1967 | Parkison |
| 3,342,419 A | 9/1967 | Weese |
| 3,344,994 A | 10/1967 | Fife |
| 3,383,051 A | 5/1968 | Fiorentino |
| 3,389,925 A | 6/1968 | Gottschald |
| 3,393,311 A | 7/1968 | Dahl |
| 3,393,312 A | 7/1968 | Dahl |
| 3,404,410 A | 10/1968 | Sumida |
| 3,492,029 A | 1/1970 | French et al. |
| 3,516,611 A | 6/1970 | Piggott |
| 3,546,961 A | 12/1970 | Marton |
| 3,550,863 A | 12/1970 | McDermott |
| 3,565,116 A | 2/1971 | Gabin |
| 3,584,822 A | 6/1971 | Oram |
| 3,596,835 A | 8/1971 | Smith et al. |
| 3,612,577 A | 10/1971 | Pope |
| 3,641,333 A | 2/1972 | Gendron |
| 3,663,044 A | 5/1972 | Contreras et al. |
| 3,669,470 A | 6/1972 | Deurloo |
| 3,682,392 A | 8/1972 | Kint |
| 3,685,745 A | 8/1972 | Peschcke-kocdt |
| D224,834 S | 9/1972 | Laudell |
| 3,711,029 A | 1/1973 | Bartlett |
| 3,722,798 A | 3/1973 | Bletcher et al. ............ 239/428 |
| 3,722,799 A | 3/1973 | Rauh |
| 3,731,084 A | 5/1973 | Trevorrow |
| 3,754,779 A | 8/1973 | Peress |
| 3,768,735 A | 10/1973 | Ward |
| 3,786,995 A | 1/1974 | Manoogian et al. |
| 3,801,019 A | 4/1974 | Trenary et al. |
| 3,810,580 A | 5/1974 | Rauh |
| 3,826,454 A | 7/1974 | Zieger |
| 3,860,271 A | 1/1975 | Rodgers |
| 3,861,719 A | 1/1975 | Hand |
| 3,865,310 A | 2/1975 | Elkins et al. |
| 3,869,151 A | 3/1975 | Fletcher et al. |
| 3,896,845 A | 7/1975 | Parker |
| 3,902,671 A | 9/1975 | Symmons |
| 3,910,277 A | 10/1975 | Zimmer |
| D237,708 S | 11/1975 | Grohe |
| 3,929,164 A | 12/1975 | Richter |
| 3,958,756 A | 5/1976 | Trenary et al. |
| D240,322 S | 6/1976 | Staub |
| 3,967,783 A | 7/1976 | Halsted et al. |
| 3,979,096 A | 9/1976 | Zieger |
| 3,998,390 A | 12/1976 | Peterson et al. |
| 3,999,714 A | 12/1976 | Lang |
| 4,005,880 A | 2/1977 | Anderson et al. |
| 4,006,920 A | 2/1977 | Sadler et al. |
| 4,023,782 A | 5/1977 | Eifer |
| 4,045,054 A | 8/1977 | Arnold |
| D245,858 S | 9/1977 | Grube |
| D245,860 S | 9/1977 | Grube |
| 4,068,801 A | 1/1978 | Leutheuser |
| 4,081,135 A | 3/1978 | Tomaro |
| 4,084,271 A | 4/1978 | Ginsberg |
| 4,091,998 A | 5/1978 | Peterson |
| D249,356 S | 9/1978 | Nagy |
| 4,117,979 A | 10/1978 | Lagarelli et al. |

| Patent No. | Date | Inventor |
|---|---|---|
| 4,133,486 A | 1/1979 | Fanella |
| D251,045 S | 2/1979 | Grube |
| 4,141,502 A | 2/1979 | Grohe |
| 4,151,955 A | 5/1979 | Stouffer |
| 4,151,957 A | 5/1979 | Gecewicz et al. |
| 4,162,801 A | 7/1979 | Kresky et al. |
| 4,165,837 A | 8/1979 | Rundzaitis |
| 4,174,822 A | 11/1979 | Larsson |
| 4,185,781 A | 1/1980 | O'Brien |
| 4,190,207 A | 2/1980 | Fienhold et al. |
| 4,191,332 A | 3/1980 | De Langis et al. |
| 4,203,550 A | 5/1980 | On |
| 4,209,132 A | 6/1980 | Kwan |
| D255,626 S | 7/1980 | Grube |
| 4,219,160 A | 8/1980 | Allred, Jr. |
| 4,221,338 A | 9/1980 | Shames et al. |
| 4,243,253 A | 1/1981 | Rogers, Jr. |
| 4,244,526 A | 1/1981 | Arth |
| D258,677 S | 3/1981 | Larsson |
| 4,254,914 A | 3/1981 | Shames et al. |
| 4,258,414 A | 3/1981 | Sokol |
| 4,272,022 A | 6/1981 | Evans |
| 4,274,400 A | 6/1981 | Baus |
| 4,282,612 A | 8/1981 | King |
| D261,300 S | 10/1981 | Klose |
| D261,417 S | 10/1981 | Klose |
| 4,303,201 A | 12/1981 | Elkins et al. |
| 4,319,608 A | 3/1982 | Raikov et al. |
| 4,330,089 A | 5/1982 | Finkbeiner |
| D266,212 S | 9/1982 | Haug |
| 4,350,298 A | 9/1982 | Tada |
| 4,353,508 A | 10/1982 | Butterfield et al. |
| D267,582 S | 1/1983 | Mackay et al. |
| D268,442 S | 3/1983 | Darmon |
| D268,611 S | 4/1983 | Klose |
| 4,383,554 A | 5/1983 | Merriman |
| 4,396,797 A | 8/1983 | Sakuragi et al. |
| 4,398,669 A | 8/1983 | Fienhold |
| 4,425,965 A | 1/1984 | Bayh, III et al. |
| D274,457 S | 6/1984 | Haug |
| 4,461,052 A | 7/1984 | Mostul |
| 4,465,308 A | 8/1984 | Martini |
| 4,467,964 A | 8/1984 | Kaeser |
| 4,495,550 A | 1/1985 | Visciano |
| 4,527,745 A | 7/1985 | Butterfield et al. |
| 4,540,202 A | 9/1985 | Amphoux et al. |
| 4,545,081 A | 10/1985 | Nestor et al. |
| 4,553,775 A | 11/1985 | Halling |
| D281,820 S | 12/1985 | Oba et al. |
| 4,561,593 A | 12/1985 | Cammack et al. |
| 4,571,003 A | 2/1986 | Roling et al. |
| D283,645 S | 4/1986 | Tanaka |
| 4,587,991 A | 5/1986 | Chorkey |
| 4,588,130 A | 5/1986 | Trenary et al. |
| 4,598,866 A | 7/1986 | Cammack et al. |
| 4,614,303 A | 9/1986 | Moseley, Jr. et al. |
| 4,618,100 A | 10/1986 | White et al. |
| 4,629,124 A | 12/1986 | Gruber |
| 4,629,125 A | 12/1986 | Liu |
| 4,643,463 A | 2/1987 | Halling et al. |
| 4,645,244 A | 2/1987 | Curtis |
| 4,650,120 A | 3/1987 | Kress |
| 4,650,470 A | 3/1987 | Epstein |
| 4,652,025 A | 3/1987 | Conroy, Sr. |
| 4,657,185 A | 4/1987 | Rundzaitis |
| 4,669,666 A | 6/1987 | Finkbeiner |
| 4,669,757 A | 6/1987 | Bartholomew |
| 4,674,687 A | 6/1987 | Smith et al. |
| 4,683,917 A | 8/1987 | Bartholomew |
| 4,703,893 A | 11/1987 | Gruber |
| 4,719,654 A | 1/1988 | Blessing |
| 4,733,337 A | 3/1988 | Bieberstein |
| D295,437 S | 4/1988 | Fabian |
| 4,739,801 A | 4/1988 | Kimura et al. |
| D296,582 S | 7/1988 | Haug et al. |
| 4,754,928 A | 7/1988 | Rogers et al. |
| D297,160 S | 8/1988 | Robbins |
| 4,778,104 A | 10/1988 | Fisher |
| 4,787,591 A | 11/1988 | Villacorta |
| 4,790,294 A | 12/1988 | Allred, III et al. |
| 4,801,091 A | 1/1989 | Sandvik |
| 4,809,369 A | 3/1989 | Bowden |
| 4,839,599 A | 6/1989 | Fischer |
| 4,842,059 A | 6/1989 | Tomek |
| D302,325 S | 7/1989 | Charet et al. |
| 4,850,616 A | 7/1989 | Pava |
| 4,856,822 A | 8/1989 | Parker |
| 4,865,362 A | 9/1989 | Holden |
| 4,871,196 A | 10/1989 | Kingsford |
| D306,351 S | 2/1990 | Charet et al. |
| 4,901,927 A | 2/1990 | Valdivia |
| 4,903,178 A | 2/1990 | Englot et al. |
| 4,903,897 A | 2/1990 | Hayes |
| 4,903,922 A | 2/1990 | Harris, III |
| 4,907,137 A | 3/1990 | Schladitz et al. |
| 4,914,759 A | 4/1990 | Goff |
| 4,946,202 A | 8/1990 | Perricone |
| 4,951,329 A | 8/1990 | Shaw |
| 4,953,585 A | 9/1990 | Rollini et al. |
| 4,964,573 A | 10/1990 | Lipski |
| 4,972,048 A | 11/1990 | Martin |
| D313,267 S | 12/1990 | Lenci et al. |
| D314,246 S | 1/1991 | Bache |
| D315,191 S | 3/1991 | Mikol |
| D317,348 S | 6/1991 | Geneve et al. |
| 5,022,103 A | 6/1991 | Faist |
| 5,032,015 A | 7/1991 | Christianson |
| 5,033,528 A | 7/1991 | Volcani |
| 5,033,897 A | 7/1991 | Chen |
| D320,064 S | 9/1991 | Presman |
| 5,046,764 A | 9/1991 | Kimura et al. |
| D321,062 S | 10/1991 | Bonbright |
| D322,119 S | 12/1991 | Haug et al. |
| D322,681 S | 12/1991 | Yuen |
| 5,070,552 A | 12/1991 | Gentry et al. |
| D323,545 S | 1/1992 | Ward |
| 5,082,019 A | 1/1992 | Tetrault |
| 5,086,878 A | 2/1992 | Swift |
| 5,090,624 A | 2/1992 | Rogers |
| 5,100,055 A | 3/1992 | Rokitenetz et al. |
| D325,769 S | 4/1992 | Haug et al. |
| D325,770 S | 4/1992 | Haug et al. |
| 5,103,384 A | 4/1992 | Drohan |
| D326,311 S | 5/1992 | Lenci et al. |
| D327,729 S | 7/1992 | Rogers |
| 5,134,251 A | 7/1992 | Martin |
| D328,944 S | 8/1992 | Robbins |
| 5,141,016 A | 8/1992 | Nowicki |
| D329,504 S | 9/1992 | Yuen |
| 5,143,300 A | 9/1992 | Cutler |
| 5,145,114 A | 9/1992 | Monch |
| D330,068 S | 10/1992 | Haug et al. |
| D330,408 S | 10/1992 | Thacker |
| D330,409 S | 10/1992 | Raffo |
| 5,153,976 A | 10/1992 | Benchaar et al. |
| 5,154,355 A | 10/1992 | Gonzalez |
| 5,154,483 A | 10/1992 | Zeller |
| 5,163,752 A | 11/1992 | Copeland et al. |
| 5,172,860 A | 12/1992 | Yuch |
| 5,172,862 A | 12/1992 | Heimann et al. |
| 5,172,866 A | 12/1992 | Ward |
| D332,303 S | 1/1993 | Klose |

| | | | | | |
|---|---|---|---|---|---|
| D332,994 S | 2/1993 | Huen | 5,476,225 A | 12/1995 | Chan |
| D333,339 S | 2/1993 | Klose | D366,309 S | 1/1996 | Huang |
| 5,197,767 A | 3/1993 | Kimura et al. | D366,707 S | 1/1996 | Kaiser |
| D334,794 S | 4/1993 | Klose | D366,708 S | 1/1996 | Santarsiero |
| D335,171 S | 4/1993 | Lenci et al. | D366,709 S | 1/1996 | Szmanski |
| 5,201,468 A | 4/1993 | Freier et al. | D366,710 S | 1/1996 | Szymanski |
| 5,213,267 A | 5/1993 | Heimann et al. | 5,481,765 A | 1/1996 | Wang |
| 5,220,697 A | 6/1993 | Birchfield | D366,948 S | 2/1996 | Carbone |
| D337,839 S | 7/1993 | Zeller | D367,315 S | 2/1996 | Andrus |
| 5,228,625 A | 7/1993 | Grassberger | D367,333 S | 2/1996 | Swyst |
| D338,542 S | 8/1993 | Yuen | D367,696 S | 3/1996 | Andrus |
| 5,232,162 A | 8/1993 | Chih | D367,934 S | 3/1996 | Carbone |
| D339,492 S | 9/1993 | Klose | D368,146 S | 3/1996 | Carbone |
| D339,627 S | 9/1993 | Klose | D368,317 S | 3/1996 | Swyst |
| D339,848 S | 9/1993 | Gottwald | 5,499,767 A | 3/1996 | Morand |
| 5,246,169 A | 9/1993 | Heimann et al. | D368,539 S | 4/1996 | Carbone et al. |
| D340,376 S | 10/1993 | Klose | D368,540 S | 4/1996 | Santarsiero |
| 5,254,809 A | 10/1993 | Martin | D368,541 S | 4/1996 | Kaiser et al. |
| D341,007 S | 11/1993 | Haug et al. | D368,542 S | 4/1996 | deBlois et al. |
| D341,191 S | 11/1993 | Klose | D369,204 S | 4/1996 | Andrus |
| D341,220 S | 11/1993 | Eagan | D369,205 S | 4/1996 | Andrus |
| 5,263,646 A | 11/1993 | McCauley | 5,507,436 A | 4/1996 | Ruttenberg |
| 5,265,833 A | 11/1993 | Heimann et al. | D369,873 S | 5/1996 | deBlois et al. |
| 5,268,826 A | 12/1993 | Greene | D369,874 S | 5/1996 | Santarsiero |
| 5,276,596 A | 1/1994 | Krenzel | D369,875 S | 5/1996 | Carbone |
| 5,277,391 A | 1/1994 | Haug et al. | D370,052 S | 5/1996 | Chan et al. |
| 5,286,071 A | 2/1994 | Storage | D370,250 S | 5/1996 | Fawcett et al. |
| 5,288,110 A | 2/1994 | Allread | D370,277 S | 5/1996 | Kaiser |
| 5,294,054 A | 3/1994 | Benedict et al. | D370,278 S | 5/1996 | Nolan |
| 5,297,735 A | 3/1994 | Heimann et al. | D370,279 S | 5/1996 | deBlois |
| D345,811 S | 4/1994 | Van Deursen et al. | D370,280 S | 5/1996 | Kaiser |
| D346,428 S | 4/1994 | Warshawsky | D370,281 S | 5/1996 | Johnstone et al. |
| D346,430 S | 4/1994 | Warshawsky | 5,517,392 A | 5/1996 | Rousso et al. |
| D346,809 S | 5/1994 | Warshawsky | 5,521,803 A | 5/1996 | Eckert et al. |
| D347,262 S | 5/1994 | Black et al. | D370,542 S | 6/1996 | Santarsiero |
| D347,265 S | 5/1994 | Gottwald | D370,735 S | 6/1996 | deBlois |
| 5,316,216 A | 5/1994 | Cammack et al. | D370,987 S | 6/1996 | Santarsiero |
| D348,720 S | 7/1994 | Haug et al. | D370,988 S | 6/1996 | Santarsiero |
| D349,947 S | 8/1994 | Hing-Wah | D371,448 S | 7/1996 | Santarsiero |
| 5,333,787 A | 8/1994 | Smith et al. | D371,618 S | 7/1996 | Nolan |
| 5,340,064 A | 8/1994 | Heimann et al. | D371,619 S | 7/1996 | Szymanski |
| 5,340,165 A | 8/1994 | Sheppard | D371,856 S | 7/1996 | Carbone |
| D350,808 S | 9/1994 | Warshawsky | D372,318 S | 7/1996 | Szymanski |
| 5,344,080 A | 9/1994 | Matsui | D372,319 S | 7/1996 | Carbone |
| 5,349,987 A | 9/1994 | Shieh | 5,531,625 A | 7/1996 | Zhong |
| 5,356,077 A | 10/1994 | Shames | D372,548 S | 8/1996 | Carbone |
| D352,347 S | 11/1994 | Dannenberg | D372,998 S | 8/1996 | Carbone |
| D352,766 S | 11/1994 | Hill et al. | D373,210 S | 8/1996 | Santarsiero |
| 5,368,235 A | 11/1994 | Drozdoff et al. | D373,434 S | 9/1996 | Nolan |
| 5,369,556 A | 11/1994 | Zeller | D373,435 S | 9/1996 | Nolan |
| 5,370,427 A | 12/1994 | Hoelle et al. | D373,645 S | 9/1996 | Johnstone et al. |
| 5,385,500 A | 1/1995 | Schmidt | D373,646 S | 9/1996 | Szymanski et al. |
| D355,242 S | 2/1995 | Warshawsky | D373,647 S | 9/1996 | Kaiser |
| D355,703 S | 2/1995 | Duell | D373,648 S | 9/1996 | Kaiser |
| D356,626 S | 3/1995 | Wang | D373,649 S | 9/1996 | Carbone |
| 5,397,064 A | 3/1995 | Heitzman | D373,651 S | 9/1996 | Szymanski |
| 5,398,872 A | 3/1995 | Joubran | D373,652 S | 9/1996 | Kaiser |
| 5,398,977 A | 3/1995 | Berger et al. | 5,551,637 A | 9/1996 | Lo |
| 5,402,812 A | 4/1995 | Moineau et al. | 5,558,278 A | 9/1996 | Gallorini |
| 5,405,089 A | 4/1995 | Heimann et al. | D374,271 S | 10/1996 | Fleischmann |
| 5,423,348 A | 6/1995 | Jezek et al. | D374,297 S | 10/1996 | Kaiser |
| 5,433,384 A | 7/1995 | Chan et al. | D374,298 S | 10/1996 | Swyst |
| D361,399 S | 8/1995 | Carbone et al. | D374,299 S | 10/1996 | Carbone |
| D361,623 S | 8/1995 | Huen | D374,493 S | 10/1996 | Szymanski |
| 5,449,206 A | 9/1995 | Lockwood | D374,494 S | 10/1996 | Santarsiero |
| D363,360 S | 10/1995 | Santarsiero | D374,732 S | 10/1996 | Kaiser |
| 5,454,809 A | 10/1995 | Janssen | D374,733 S | 10/1996 | Santasiero |
| 5,468,057 A | 11/1995 | Megerle et al. | 5,560,548 A | 10/1996 | Mueller et al. |
| D364,935 S | 12/1995 | deBlois | 5,567,115 A | 10/1996 | Carbone |
| D365,625 S | 12/1995 | Bova | D375,541 S | 11/1996 | Michaluk |
| D365,646 S | 12/1995 | deBlois | 5,577,664 A | 11/1996 | Heitzman |

| | | | | | | |
|---|---|---|---|---|---|---|
| D376,217 S | 12/1996 | Kaiser | | D418,903 S | 1/2000 | Haverstraw et al. |
| D376,860 S | 12/1996 | Santarsiero | | D422,053 S | 3/2000 | Brenner et al. |
| D376,861 S | 12/1996 | Johnstone et al. | | 6,042,027 A | 3/2000 | Sandvik |
| D376,862 S | 12/1996 | Carbone | | 6,042,155 A | 3/2000 | Lockwood |
| D378,401 S | 3/1997 | Neufeld et al. | | D422,336 S | 4/2000 | Haverstraw et al. |
| 5,613,638 A | 3/1997 | Blessing | | D422,337 S | 4/2000 | Chan |
| 5,613,639 A | 3/1997 | Storm et al. | | D423,083 S | 4/2000 | Haug et al. |
| 5,615,837 A | 4/1997 | Roman | | D424,160 S | 5/2000 | Haug et al. |
| 5,624,074 A | 4/1997 | Parisi | | D424,161 S | 5/2000 | Haug et al. |
| D379,212 S | 5/1997 | Chan | | D427,661 S | 7/2000 | Haverstraw et al. |
| D379,404 S | 5/1997 | Spelts | | D428,110 S | 7/2000 | Haug et al. |
| 5,632,049 A | 5/1997 | Chen | | D428,125 S | 7/2000 | Chan |
| D381,405 S | 7/1997 | Waidele et al. | | 6,123,272 A | 9/2000 | Havican et al. |
| D381,737 S | 7/1997 | Chan | | D432,624 S | 10/2000 | Chan |
| D382,936 S | 8/1997 | Shfaram | | D433,096 S | 10/2000 | Tse |
| 5,653,260 A | 8/1997 | Huber | | D433,097 S | 10/2000 | Tse |
| 5,667,146 A | 9/1997 | Pimentel et al. | | 6,126,091 A | 10/2000 | Heitzman |
| 5,669,964 A | 9/1997 | Kai | | D434,109 S | 11/2000 | Ko |
| D385,332 S | 10/1997 | Andrus | | 6,164,569 A | 12/2000 | Hollinshead et al. |
| D385,333 S | 10/1997 | Caroen et al. | | 6,164,570 A | 12/2000 | Smeltzer |
| D385,334 S | 10/1997 | Caroen et al. | | D435,889 S | 1/2001 | Ben-Tsur et al. |
| D385,616 S | 10/1997 | Dow et al. | | D443,025 S | 5/2001 | Kollmann et al. |
| D385,947 S | 11/1997 | Dow et al. | | D443,029 S | 5/2001 | Kollmann et al. |
| D387,230 S | 12/1997 | von Buelow et al. | | 6,230,984 B1 | 5/2001 | Jager |
| 5,702,057 A | 12/1997 | Huber | | 6,230,988 B1 * | 5/2001 | Chao .......................... 239/394 |
| D389,558 S | 1/1998 | Andrus | | 6,230,989 B1 | 5/2001 | Haverstraw et al. |
| 5,704,080 A | 1/1998 | Kuhne | | 6,250,572 B1 | 6/2001 | Chen |
| 5,718,380 A | 2/1998 | Schorn et al. | | 6,254,014 B1 | 7/2001 | Clearman et al. |
| D392,369 S | 3/1998 | Chan | | 6,270,278 B1 | 8/2001 | Mauro |
| 5,730,361 A | 3/1998 | Thonnes | | 6,276,004 B1 | 8/2001 | Bertrand et al. |
| 5,730,362 A | 3/1998 | Cordes | | D450,370 S | 11/2001 | Wales et al. |
| 5,730,363 A | 3/1998 | Kress | | D450,805 S | 11/2001 | Lindholm et al. |
| 5,742,961 A | 4/1998 | Casperson et al. | | D450,806 S | 11/2001 | Lindholm et al. |
| D394,490 S | 5/1998 | Andrus et al. | | D450,807 S | 11/2001 | Lindholm et al. |
| 5,746,375 A | 5/1998 | Guo | | D451,169 S | 11/2001 | Lindholm et al. |
| 5,749,552 A | 5/1998 | Fan | | D451,170 S | 11/2001 | Lindholm et al. |
| 5,749,602 A | 5/1998 | Delaney et al. | | D451,171 S | 11/2001 | Lindholm et al. |
| D394,899 S | 6/1998 | Caroen et al. | | D451,172 S | 11/2001 | Lindholm et al. |
| D395,074 S | 6/1998 | Neibrook | | D451,583 S | 12/2001 | Lindholm et al. |
| D395,075 S | 6/1998 | Kolada | | D451,980 S | 12/2001 | Lindholm et al. |
| D395,142 S | 6/1998 | Neibrook | | D452,553 S | 12/2001 | Lindholm et al. |
| 5,765,760 A | 6/1998 | Kuo | | D452,725 S | 1/2002 | Lindholm et al. |
| 5,769,802 A | 6/1998 | Wang | | D452,897 S | 1/2002 | Gillette et al. |
| 5,772,120 A | 6/1998 | Huber | | D453,370 S | 2/2002 | Lindholm et al. |
| 5,778,939 A | 7/1998 | Hok-Yin | | D453,551 S | 2/2002 | Lindholm et al. |
| 5,788,157 A | 8/1998 | Kress | | D457,937 S | 5/2002 | Lindholm et al. |
| D398,370 S | 9/1998 | Purdy | | 6,454,186 B1 | 9/2002 | Haverstraw et al. |
| 5,806,771 A | 9/1998 | Loschelder et al. | | 6,464,265 B1 | 10/2002 | Mikol |
| 5,819,791 A | 10/1998 | Chronister et al. | | D468,800 S | 1/2003 | Tse |
| 5,820,574 A | 10/1998 | Henkin et al. | | D471,953 S | 3/2003 | Colligan et al. |
| 5,839,666 A | 11/1998 | Heimann et al. | | 6,533,194 B1 | 3/2003 | Marsh et al. |
| D402,350 S | 12/1998 | Andrus | | 6,641,057 B1 | 11/2003 | Thomas et al. |
| D404,116 S | 1/1999 | Bosio | | D485,887 S | 1/2004 | Luettgen et al. |
| 5,855,348 A | 1/1999 | Fornara | | D487,498 S * | 3/2004 | Blomstrom ................. D23/213 |
| 5,860,599 A | 1/1999 | Lin | | D490,498 S | 5/2004 | Golichowski |
| 5,862,543 A | 1/1999 | Reynoso et al. | | 6,739,523 B2 | 5/2004 | Haverstraw et al. |
| 5,862,985 A | 1/1999 | Neibrook et al. | | D492,007 S | 6/2004 | Kollmann et al. |
| D405,502 S | 2/1999 | Tse | | 6,742,725 B1 | 6/2004 | Fan |
| 5,865,375 A | 2/1999 | Hsu | | D493,208 S | 7/2004 | Lin |
| 5,865,378 A | 2/1999 | Hollinshead et al. | | D496,987 S | 10/2004 | Glunk |
| D408,893 S | 4/1999 | Tse | | D497,974 S | 11/2004 | Haug et al. |
| D409,276 S | 5/1999 | Ratzlaff | | D498,514 S | 11/2004 | Haug et al. |
| D410,276 S | 5/1999 | Ben-Tsur | | D500,121 S * | 12/2004 | Blomstrom ................. D23/213 |
| 5,918,811 A | 7/1999 | Denham et al. | | D500,547 S | 1/2005 | Gray |
| 5,937,905 A | 8/1999 | Santos | | D500,549 S | 1/2005 | Blomstrom |
| 5,947,388 A | 9/1999 | Woodruff | | D501,242 S | 1/2005 | Blomstrom |
| D415,247 S | 10/1999 | Haverstraw et al. | | 2004/0195381 A1 | 10/2004 | Luettgen et al. |
| 5,992,762 A | 11/1999 | Wang | | 2005/0061896 A1 | 3/2005 | Luettgen et al. |
| D418,200 S | 12/1999 | Ben-Tsur | | 2005/0082824 A1 | 4/2005 | Luettgen et al. |
| 5,997,047 A | 12/1999 | Pimentel et al. | | | | |
| D418,902 S | 1/2000 | Haverstraw et al. | | | | |

FOREIGN PATENT DOCUMENTS

| | | |
|---|---|---|
| DE | 19608085 A1 | 9/1996 |
| EP | 167063 A1 | 6/1985 |
| EP | 0478999 | 4/1992 |
| EP | 0617644 | 10/1994 |
| EP | 0683354 A1 | 11/1995 |
| EP | 0687851 A1 | 12/1995 |
| EP | 0695907 A1 | 2/1996 |
| EP | 0719588 | 7/1996 |
| EP | 0721082 A2 | 7/1996 |
| EP | 726811 | 8/1996 |
| EP | 0733747 | 9/1996 |
| EP | 0808661 | 11/1997 |
| FR | 538538 | 6/1922 |
| FR | 873808 | 7/1942 |
| FR | 1039750 | 10/1953 |
| FR | 1098836 | 8/1955 |
| FR | 2695452 | 3/1994 |
| GB | 10086 | 4/1894 |
| GB | 3314 | 12/1914 |
| GB | 129812 | 7/1919 |
| GB | 204600 | 10/1923 |
| GB | 634483 | 3/1950 |
| GB | 971866 | 10/1964 |
| GB | 2066074 | 1/1980 |
| GB | 2066704 | 7/1981 |
| GB | 2156932 A | 10/1985 |
| GB | 2199771 | 7/1988 |
| GB | 2298595 | 11/1996 |
| IT | 327400 | 7/1935 |
| IT | 350359 | 7/1937 |
| IT | 563459 | 5/1957 |
| JP | S63-181459 | 11/1988 |
| JP | H2-78660 | 6/1990 |
| NL | 8902957 | 6/1991 |
| WO | WO 93/12894 | 7/1993 |
| WO | WO 93/25839 | 12/1993 |
| WO | WO 98/30336 | 7/1998 |

* cited by examiner

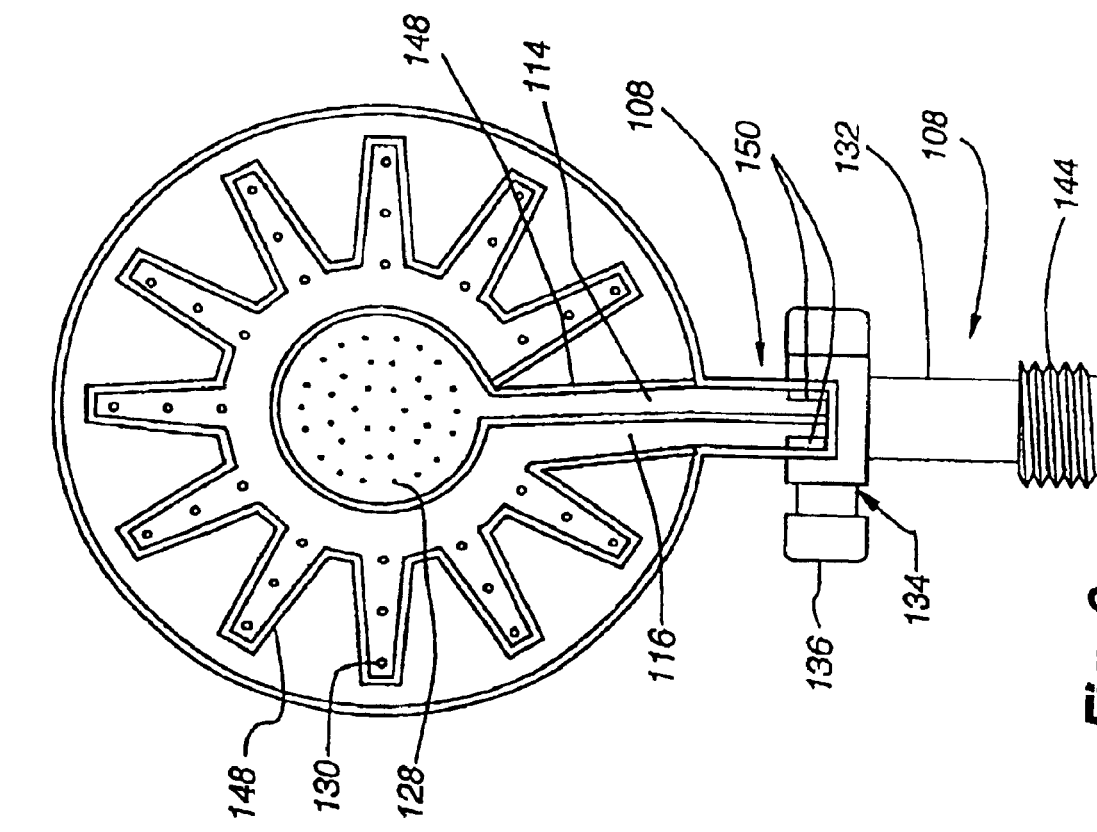
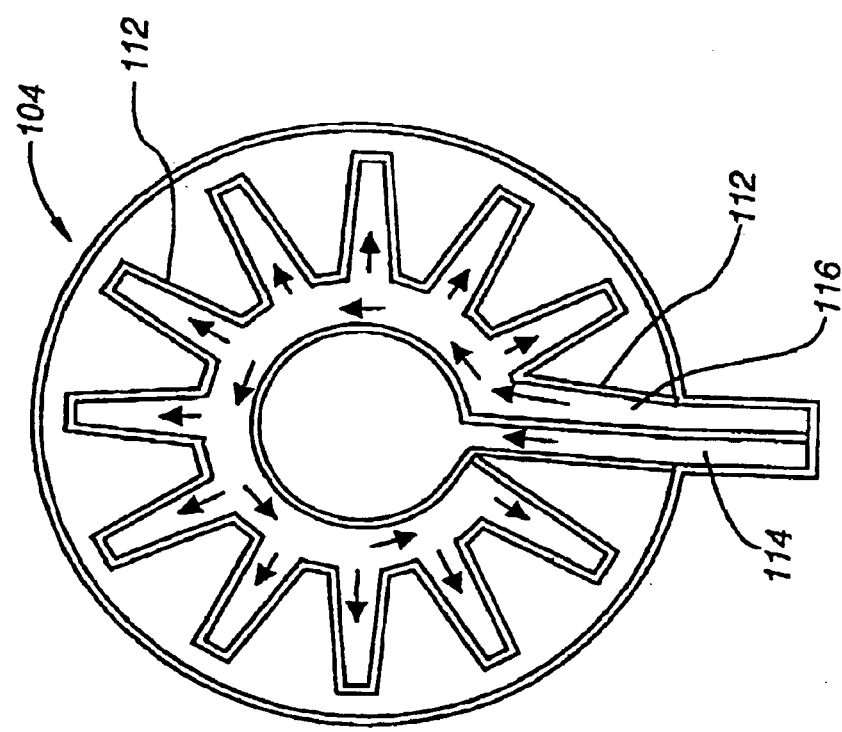
Fig. 8
Fig. 7

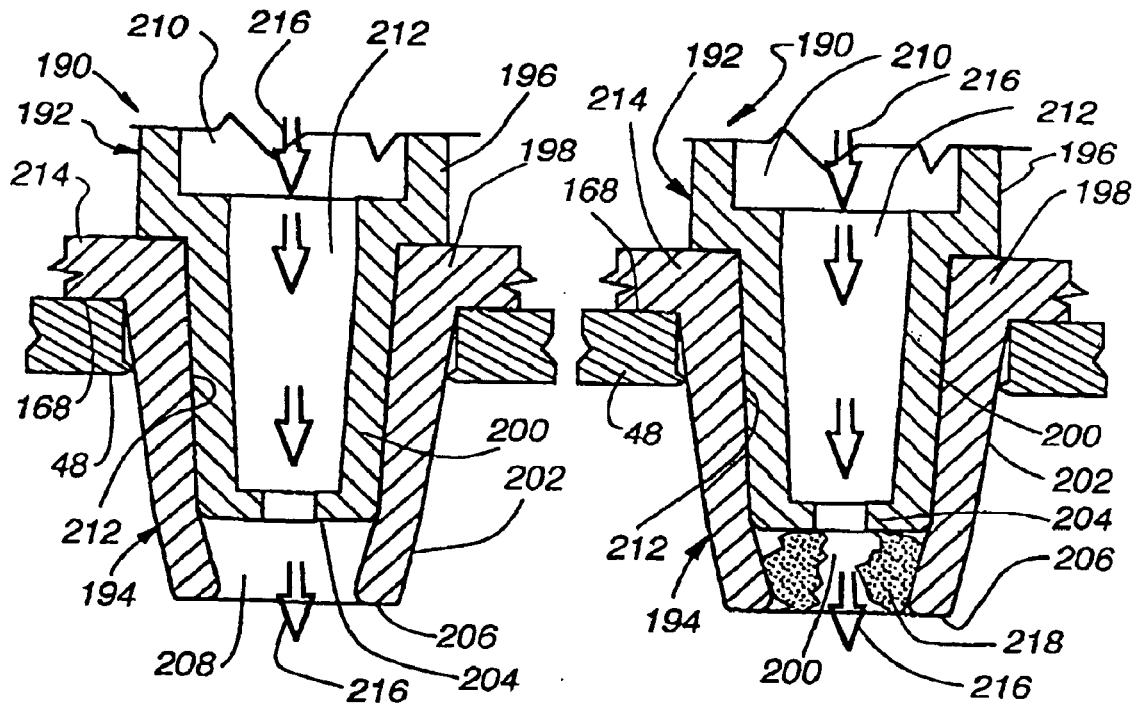
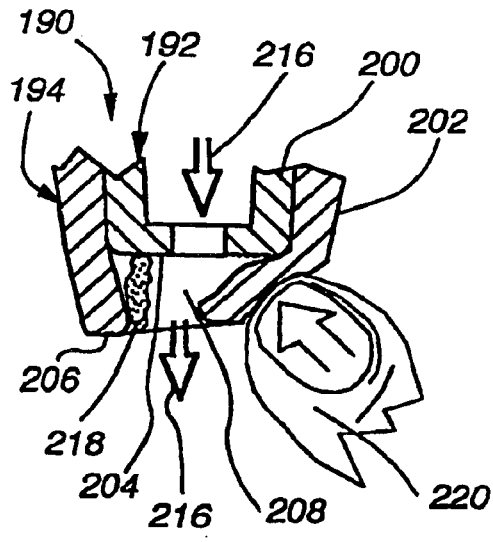
Fig. 12　Fig. 13
Fig. 14　Fig. 15

SHOWER HEAD ASSEMBLY

CROSS-REFERENCE TO RELATED APPLICATIONS

This nonprovisional application is a continuation of U.S. nonprovisional patent application Ser. No. 10/021,852, filed Dec. 12, 2001 now U.S. Pat. No. 6,641,057, and titled "Shower Head Assembly," which in turn claims priority to U.S. provisional patent application Ser. No. 60/255,369, filed on Dec. 12, 2000 now abandoned. The entire contents of the nonprovisional application and the provisional application are incorporated in their entirety by reference herein.

FIELD OF THE INVENTION

The present invention relates to a shower head and the nozzle configuration thereof.

BACKGROUND OF THE INVENTION

Generally, shower heads are used to direct water from the home water supply onto a user for personal hygiene purposes. Showers are an alternative to bathing in a bath tub.

In the past, bathing was the overwhelmingly popular choice for personal cleansing. However, in recent years showers have become increasingly popular for several reasons. First, showers generally take less time than baths. Second, showers generally use significantly less water than baths. Third, shower stalls and bath tubs with shower heads are typically easier to maintain. Over time, showers tend to cause less soap scum build-up.

With the increase in popularity of showers has come an increase in shower head designs and shower head manufacturers. Over time, several shortcomings with existing shower head designs have been identified. For example, lime and calcium deposits from high mineral content water supplies have been found to clog up the shower head apertures. As a result, shower head designers have sought to use more flexible materials in the construction of shower head nozzles. Flexible shower head nozzles allow the user to manually manipulate the shower head nozzle in an effort to clear the nozzle of lime and calcium deposits. However, existing shower head designs utilizing flexible material for their shower head nozzles are often found to have poor seals thereby resulting in a leaky shower head. Leaky shower heads are noisy, wasteful and generally unappealing. Shower head designs utilizing flexible material for the nozzle portion have also been found to have irregular shower spray streams.

Another shortcoming of existing shower head designs is that the face of existing shower head designs generally have a small surface area. Correspondingly, the surface area of jet nozzles on existing shower head designs is also small. A smaller surface area of jet nozzles generally reduces the overall area of impact of the shower.

Existing shower head designs include the use of an all rubber nozzle, which can lead to difficulty in controlling water streams. Since the nozzle material is highly compliant, the water streams are not uniform and produce irregular spray patterns where the water streams are not aimed in a uniform pattern, such as a cone. Further, the manufacturing processability of the injection molded rubbers typically used for this application often produces higher degrees of flash at the orifice location resulting in inconsistent and misdirected water streams. Flash is the residual, undesired portion of material that remains with the desired portion after the molding process. One example of such a design is shown in U.S. Pat. No. 5,730,361.

Additionally, current designs are limited in the ability to change the position of shower heads during use. Many shower heads are attached directly to the shower pipe and therefore can only be adjusted in limited directions. Recently, rainfall-type or drenching-type flow patterns, in which the water is delivered at a lower velocity to the user, are gaining popularity. However, in order to achieve this effect, the shower head should be positioned nearly directly over the head of the user. Existing shower heads are often limited in this capacity.

Accordingly, as recognized by the present inventors, there is a need for a shower head that allows the user to manually remove lime and calcium deposits that form in the shower head nozzle and also includes a leak-proof type seal. As recognized by the present inventors, there is also need for a shower head that includes flexible nozzles and a consistent, controllable shower spray stream. Additionally, as recognized by the present inventors there is a need for a shower head having an enlarged face with increased nozzle surface area that is capable of positioning directly over the head of a user and delivering a rainfall-type or drenching-type flow configuration.

It is with these shortcomings in mind that embodiments of the present invention have been developed.

SUMMARY OF THE INVENTION

According to one embodiment of the present invention, disclosed herein is a shower head that includes flexible nozzles that can be manually manipulated by a user and also provide a leak-proof seal. In one embodiment, the shower head includes at least one inner nozzle that provides improved control of the spray stream, and at least one flexible external nozzle associated with the inner nozzle.

A flexible external nozzle is readily cleanable since the buildup can be broken up by lightly pressing on each nozzle during normal cleaning. Further, the stream of water through a rigid inner nozzle can be precisely controlled and directed, as opposed to a flexible material nozzle that is much more difficult to form and directionally control.

Also disclosed herein is an enlarged shower head assembly with an outer housing having a diameter of between about 6 and 10 inches. The outer housing has a lower surface with a plurality of apertures. According to this embodiment, the shower head assembly also has a first and second set of nozzles providing for at least two flow configurations. By providing an enlarged shower head having multiple modes of water delivery, this embodiment provides an effective, lightweight enlarged shower head capable of use with flexible shower arms which can be positioned directly above the user.

According to another embodiment, disclosed herein is a shower head which includes a lower shell having a face plate with at least one aperture. At least one external nozzle protrudes through the aperture and extends below the exterior surface of the face plate. At least one inner nozzle nests within the external nozzle. The bottom surface of an inner nozzle cover having a top surface and a bottom surface is connected with the inner nozzle. An upper shell is connected to the lower shell to form an internal cavity. At least a portion of the external nozzle, the inner nozzle, and the inner nozzle cover reside within the internal cavity. In addition, the shower head of this embodiment includes a means for connecting the shower head to a home water supply and a means for controlling the level of flow that exits the shower head.

Another embodiment of the present invention includes a shower head assembly comprising a lower shell having at least one aperture, an external nozzle layer, an inner nozzle insert having at least one inner nozzle corresponding with and extending into the external nozzle, and an upper shell connected to the lower shell forming an internal cavity housing therein at least a portion of the external nozzle layer and inner nozzle insert.

In another embodiment of the present invention, a shower head nozzle assembly comprises an inner nozzle having an upper and lower portion, and an external nozzle having an upper and lower portion. The inner nozzle is nested within the external nozzle and the lower portion of the external nozzle extends below the lower portion of the inner nozzle defining a void space within the external nozzle between the lower portion of the inner nozzle and the lower portion of the external portion In another embodiment, a shower head assembly comprises an outer housing defining an internal cavity and having at least one aperture. A first means for providing consistent, directional control of a water stream through the aperture is located within the internal cavity of the housing. A second means for sealing the first means and the outer housing and for removing mineral deposits is located between the outer housing and the first means.

According to another embodiment of the present invention, a shower assembly is provided comprising an enlarged shower head having a diameter of between about 6 and 10 inches, and a flexible arm assembly operably attached to the enlarged shower head. The enlarged shower head also has a plurality of water nozzles. The water nozzles have a first inner nozzle having an upper and lower portion, and an external nozzle having an upper and lower portion disposed about the inner nozzle. The lower portion of the external nozzle extends below the lower portion of the inner nozzle defining a void space within the external nozzle between the lower portion of the inner nozzle and the lower position of the external nozzle.

Other features, utilities and advantages of various embodiments of the invention will be apparent from the following more particular description of embodiments of the invention as illustrated in the accompanying drawings.

BRIEF DESCRIPTION OF THE DRAWINGS

FIG. 7 is a bottom view of the rigid nozzle cover showing a wall extending downwardly defining two separate water channels in accordance with one embodiment of one embodiment of the present invention.

FIG. 8 is a top view of the rigid nozzle layer showing a wall extending upwardly defining two water channels corresponding with the channels shown in FIG. 9 in accordance with one embodiment of the present invention.

FIG. 12 is an enlarged section view of a nozzle assembly in accordance with one embodiment of the present invention.

FIG. 13 is an enlarged section view of a nozzle assembly in accordance with one embodiment of the present invention showing mineral deposit build-up.

FIGS. 14 and 15 illustrate a user manipulating the external nozzle to clear the lime or calcium build-up from the nozzle assembly.

DETAILED DESCRIPTION OF THE INVENTION

Figure 1:
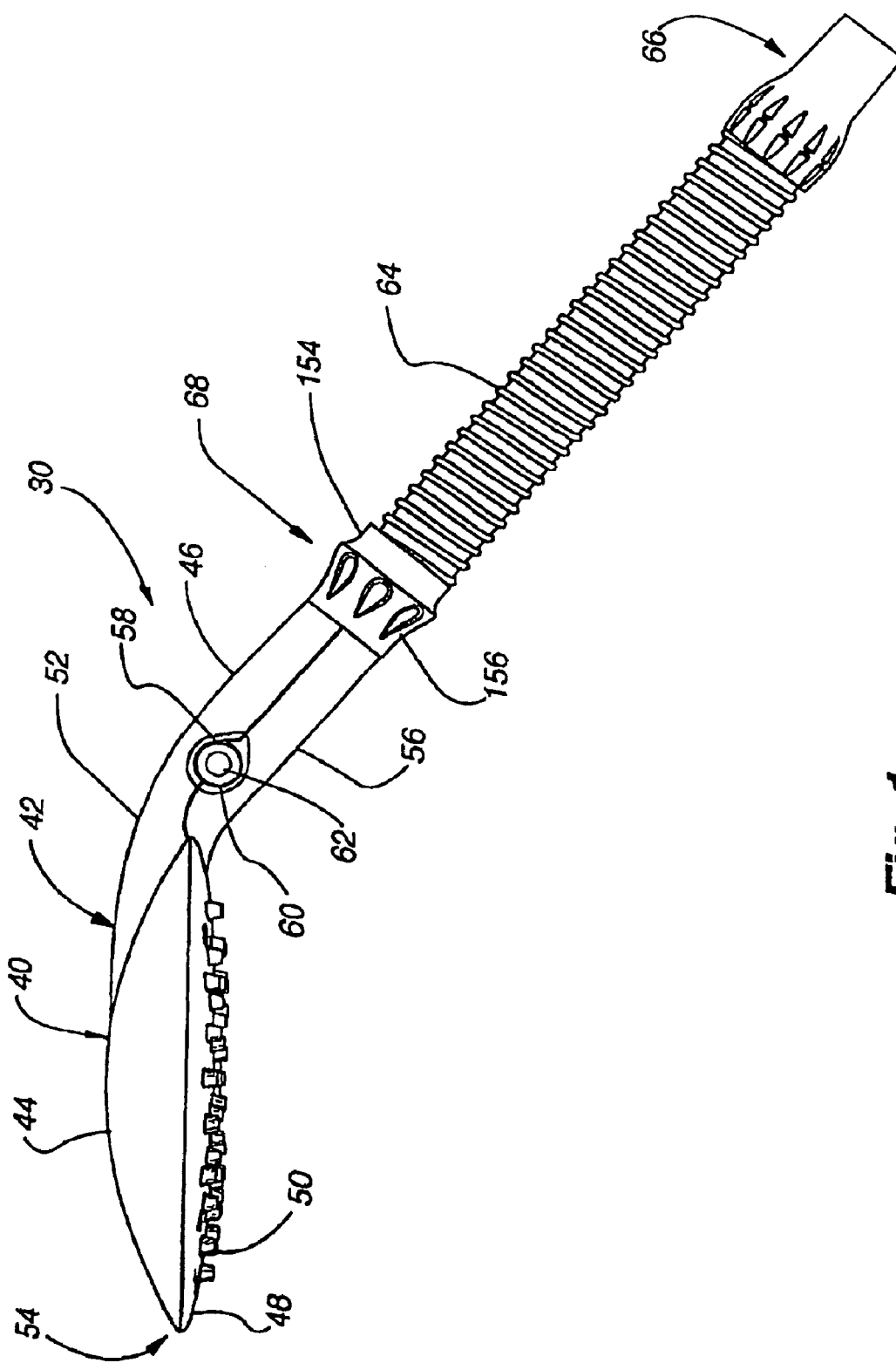
FIG. 1 is a right side view of one embodiment of the present invention.

As shown generally in the drawings, one embodiment of the present invention provides for a shower head assembly 30 having an enlarged surface area (often called a "pan head") and having at least one external, flexible nozzle. The shower head can be connected to a flexible arm assembly, in one embodiment.

Figure 2:
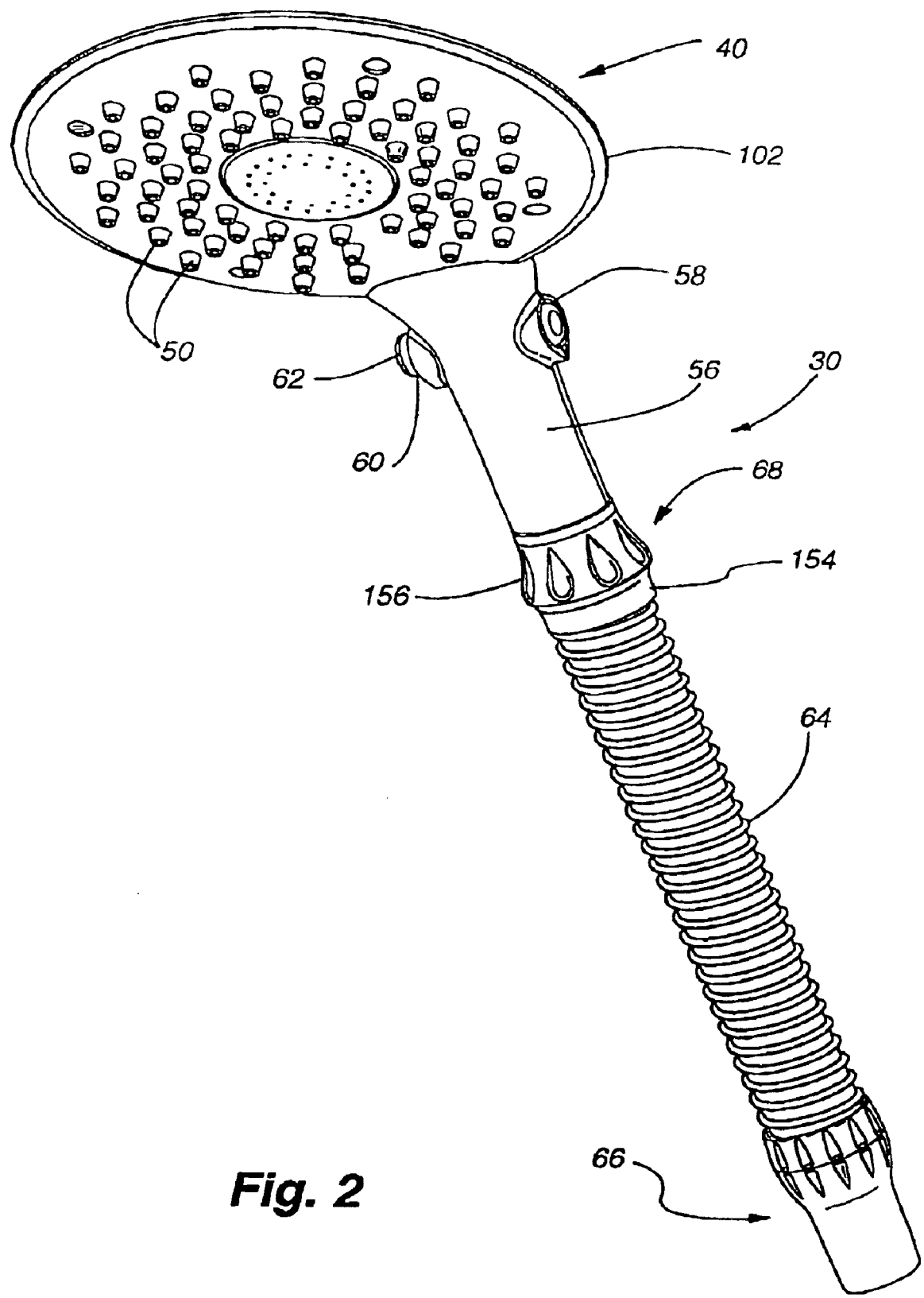
FIG. 2 is a bottom isometric view of the embodiment depicted in FIG. 1 of the present invention.
Figure 3:
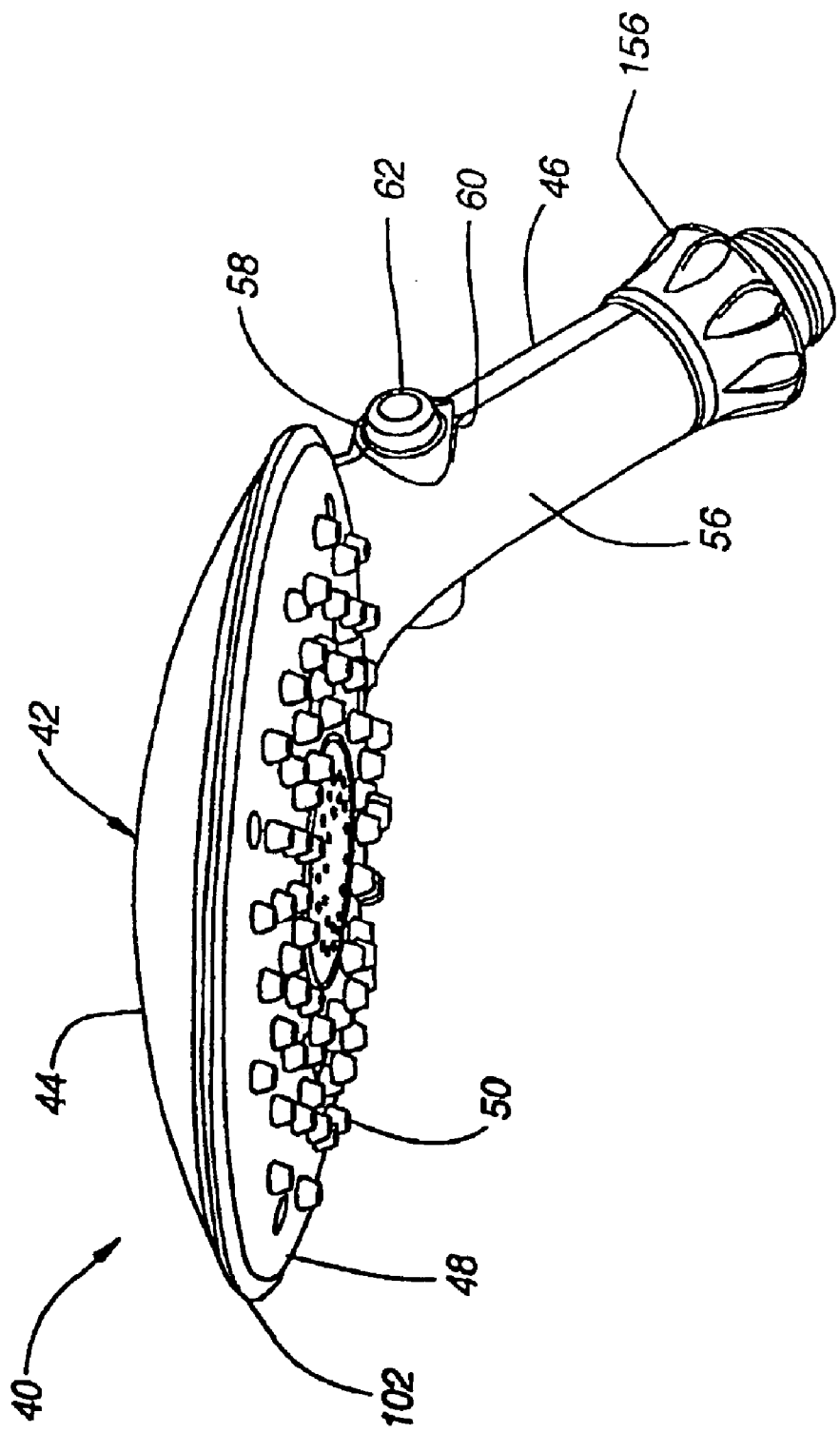
FIG. 3 is a front isometric view of one embodiment of the present invention.

FIG. 1 is a right side view of the external design of one embodiment of the present invention. FIG. 2 is a bottom isometric view of the shower head depicted in FIG. 1. While embodiments of the invention will be described in detail including the flexible shower arm shown in FIG. 2, the flexible shower arm is not required. FIG. 3 is a front isometric view of a shower head according to one embodiment of the present invention, without a shower arm assembly.

Referring to one embodiment of FIG. 1, the shower head assembly 30 includes a shower head 40 having an outer housing 42 with an upper dome shaped portion 44, a stem arm 46, a lower apertured portion 48 with a plurality of nozzles 50, and a flexible arm 64. The outer housing 42 of the shower head 40 is preferably molded from a lightweight plastic material or the like, such as ABS plastic, or any suitable thermoplastic known to those in the art. The outer housing 42 can be made from a plurality of molded pieces adapted to fit together.

The upper portion 44 of the outer housing is a shallow dome shape and forms the top surface of the shower head 40. The upper portion also has an elongated portion 52 which extends toward the arm assembly 64 and forms a part of the elongated stem 46 described below.

The elongated stem 46 increases in diameter and extends from the adjustable arm assembly 64 toward the front end 54 of the shower head 40. The stem 46 is formed with a lower stem portion 56 that is adapted to fit with the elongated portion 52 of the upper portion 44. The elongated portion 52 of the upper shell portion 44 is curved in a semi-circular shape extending from the rear end up to the head portion 54 of the shower head 40. The lower stem portion 56 stem is similarly curved until it reaches the head portion 54 of the shower head 40. Both the upper portion 44 and the lower stem portion 56 have a notch 58, 60 to receive a means 62 to adjust the flow from the arm assembly to the plurality of nozzles 50. As illustrated in FIG. 1, the ends of a spool valve 62, extend from the upper portion 44 of the stem on both sides of the stem 46. In use, either end of the spool valve can be pressed to vary the flow of water from the flexible arm assembly 64 to the nozzles.

The lower portion 48 has an apertured plate, or cosmetic cover, that is adapted to fit with the upper portion 44. The lower portion 48 mates with the upper portion through a connector ring 102 (not shown). Protruding through the apertures in the rigid cosmetic cover 48 are external nozzles 50. During operation, water from the shower arm 64 travels through the stem 46 of the shower head 40 into the internal cavity of the shower head 40, defined by the upper 44 and lower portions 48 of the housing, and out the external nozzles 50 projecting through the rigid cosmetic cover 48 of the shower head 40.

In one embodiment, the cosmetic cover 48 is used to entrap the external nozzles 50 and provide an aesthetic contrast with the external nozzles 50, both by color and texture. The rigid cosmetic cover 48 may not be necessary in some applications, depending on the desired exterior configuration of the shower head 40. In a smaller configuration, for example, an appearance may be desired in which the external nozzle 50 is exposed without a separate cosmetic cover 48.

As shown in FIG. 2, the shape of the shower head 40 is substantially round. Other shapes may be substituted as desired. The number of external nozzles 50, and accordingly, the surface area of the shower stream, are substantially increased in the present invention. As shown in FIG. 2, there are approximately 105 nozzles 50 provided in the enlarged shower head 40, in one example. This increase in the number of nozzles 50 provides a corresponding increase in the area of water delivery to the user above and beyond conventional shower heads, which are typically only ½" to 3" in diameter. In one embodiment, the shower head 40 may be between about 6" and 10" in diameter, such as between about 7" and 9" in diameter.

Figure 4:
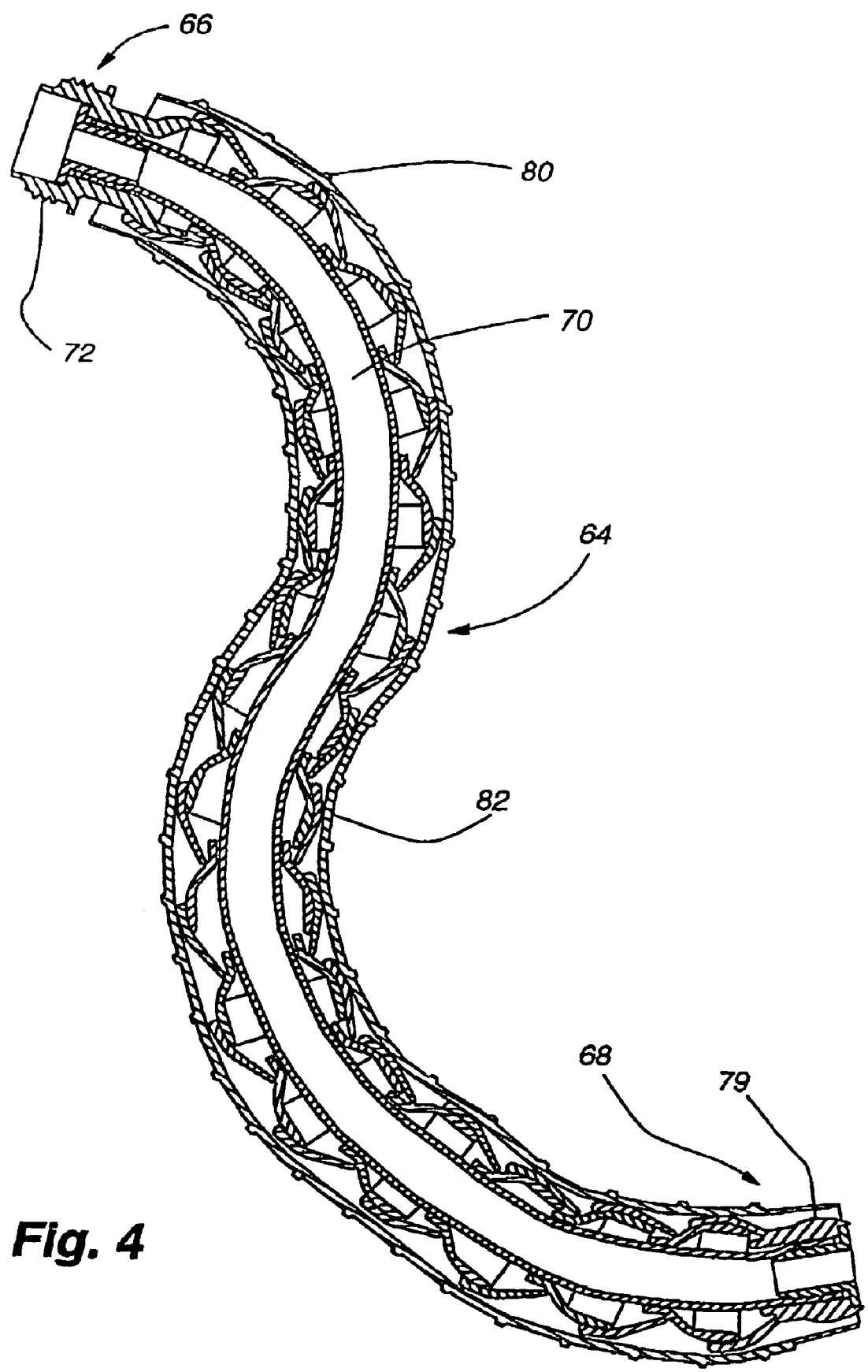
FIG. 4 is a section view of an adjustable arm assembly having an interconnecting bead structure designed for attachment of a shower head to a water pipe, which may be used with an embodiment of the present invention.

The shower head assembly 30 may also include an elongated flexible shower arm 64. As shown in FIG. 4, the shower arm 64 has first 66 and second 68 opposing ends, and a water conduit along its entire length. The first end 66 of the flexible shower arm 64 is attached to a shower pipe connector nut 72. The shower pipe connector nut 72 is in turn attached to a standard shower pipe extending from the wall of a shower stall (not shown). The second end 68 of the flexible shower arm 64 is adapted to receive the shower head. A connection structure 74 is used between the second end 68 of the flexible shower arm and the shower head 40.

In use, water flows from the shower pipe through the shower pipe connector nut 72, and into the flexible shower arm 64. The water flows through the conduit 70 (a continuous internal cavity) formed along the entire length of the flexible shower arm 64 to reach the shower head 40, and then through the nozzles 50 of the shower head 40. The flexible shower arm 64 can be configured by the user to take any of a number of positions, which allows the user to position the shower head 40 and the direction of the shower spray as desired.

Figure 5:
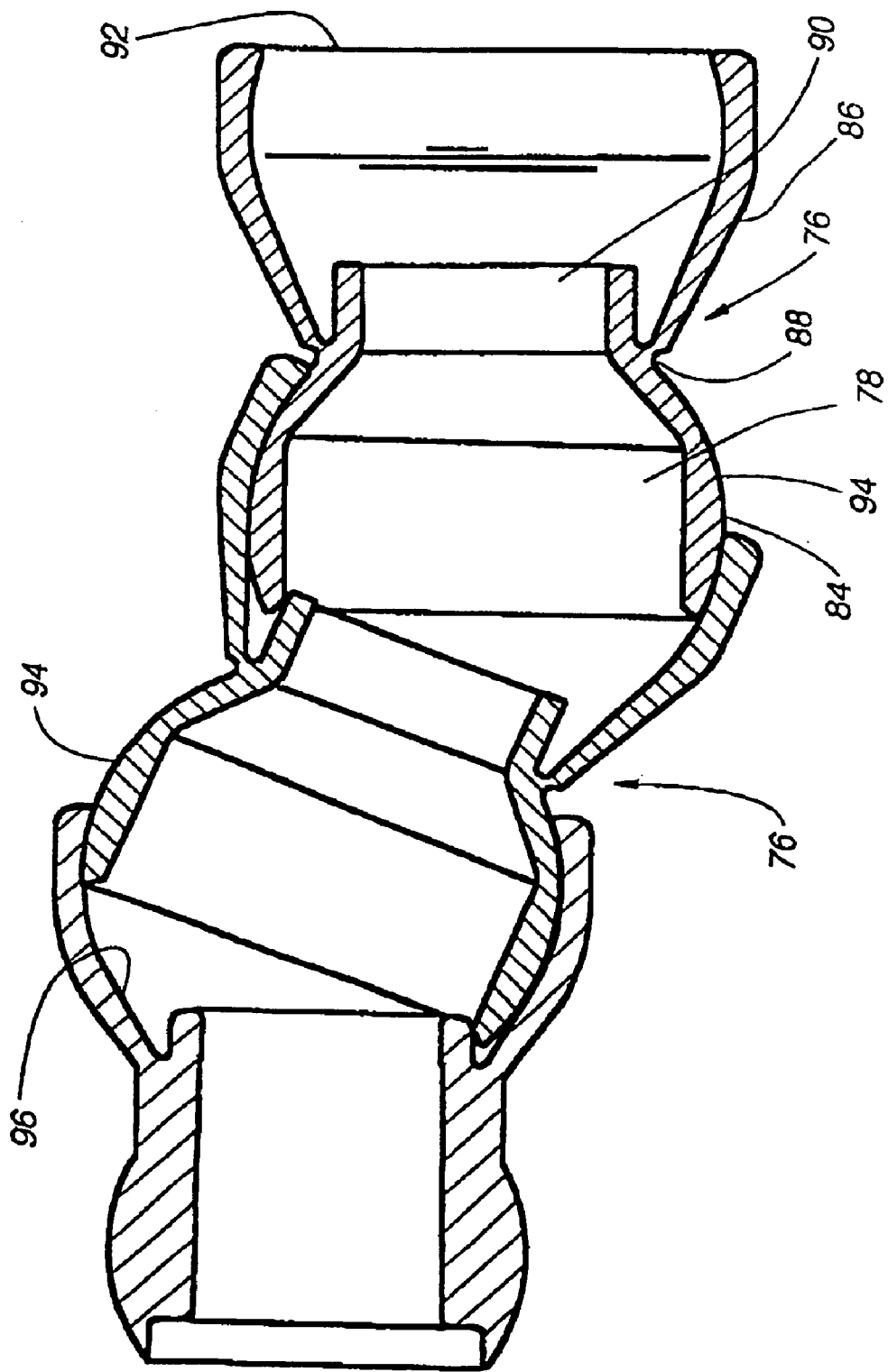
FIG. 5 is an enlarged section view of the interconnecting bead structure of FIG. 4.

As shown in FIG. 5, the flexible shower arm is made of a plurality of interlinked ball and socket beads 76 interconnected together, with each of the beads being pivotable with respect to each of the adjacent beads due to the ball and socket structure. Each bead defines an internal cavity 78 extending therethrough, and when interconnected the internal cavity is continuous and extends along the entire length of the flexible shower arm 64. Referring back to FIG. 4, a flexible hose 80 is positioned through the continuous internal cavity, or water conduit 78, for carrying fluid through the flexible arm 64 from the shower pipe nut 72 to the shower head 40. A sleeve 82 encompasses the length of the flexible shower arm 64 and extends from the shower pipe connector nut 72 to the base of the shower head 40. The sleeve 82 protects the beads 76 from moisture, dirt and other contaminants which may affect the performance of the flexible shower arm 64.

In more detail, referring to FIGS. 4 and 5, the flexible shower arm is made up of a plurality of ball and socket beads 76 which are interconnected for rotational and pivotal movement between adjacent beads. The beads are preferably made of a thermoplastic material, such as Teflon® impregnated acetal. Each bead has a smaller end 84 and a larger end 86, with a tapered neck area 88 defined between the two ends. The cavity 78 formed through the bead defines an opening 90 at the smaller end of the bead and an opening 92 at the larger end of the bead 76. The external surface 94 at the smaller end of the bead is substantially spherical in shape. The internal walls 96 of the cavity formed at the larger end 86 of the bead 76 have a substantially spherical shape for rotatably and pivotally receiving the smaller end 84 of the adjacent bead. The beads are interconnected with one another by inserting the smaller end 84 of a first bead into the cavity in the larger end 86 of the adjacent bead and so on, as shown in FIGS. 4 and 5. The engagement of the external walls 94 of the smaller end 84 of one bead with the internal walls 96 of the larger end 86 of an adjacent bead allows the plurality of beads to pivot and rotate with respect to adjacent beads to form a variety of shapes.

The shape of the cavity 78 formed in the large end 86 of the bead 76 is appropriately sized to tightly receive the smaller end 84 of an adjacent bead such that the beads 76 can rotate and pivot with respect to one another under the force of the user, however, the fit is sufficiently tight to create adequate friction to maintain the relative positions of the beads 76 once the flexible shower arm 64 is shaped by the user. This flexible shower arm assembly 64 is described in more detail in U.S. Pat. No. 5,865,378, the contents of which are hereby incorporated by reference. It is contemplated, however, that any structure which allows for repeated flexible movement to a fixed final position, and can accommodate the desired fluid transfer characteristics could be utilized for this purpose.

Figure 6A:
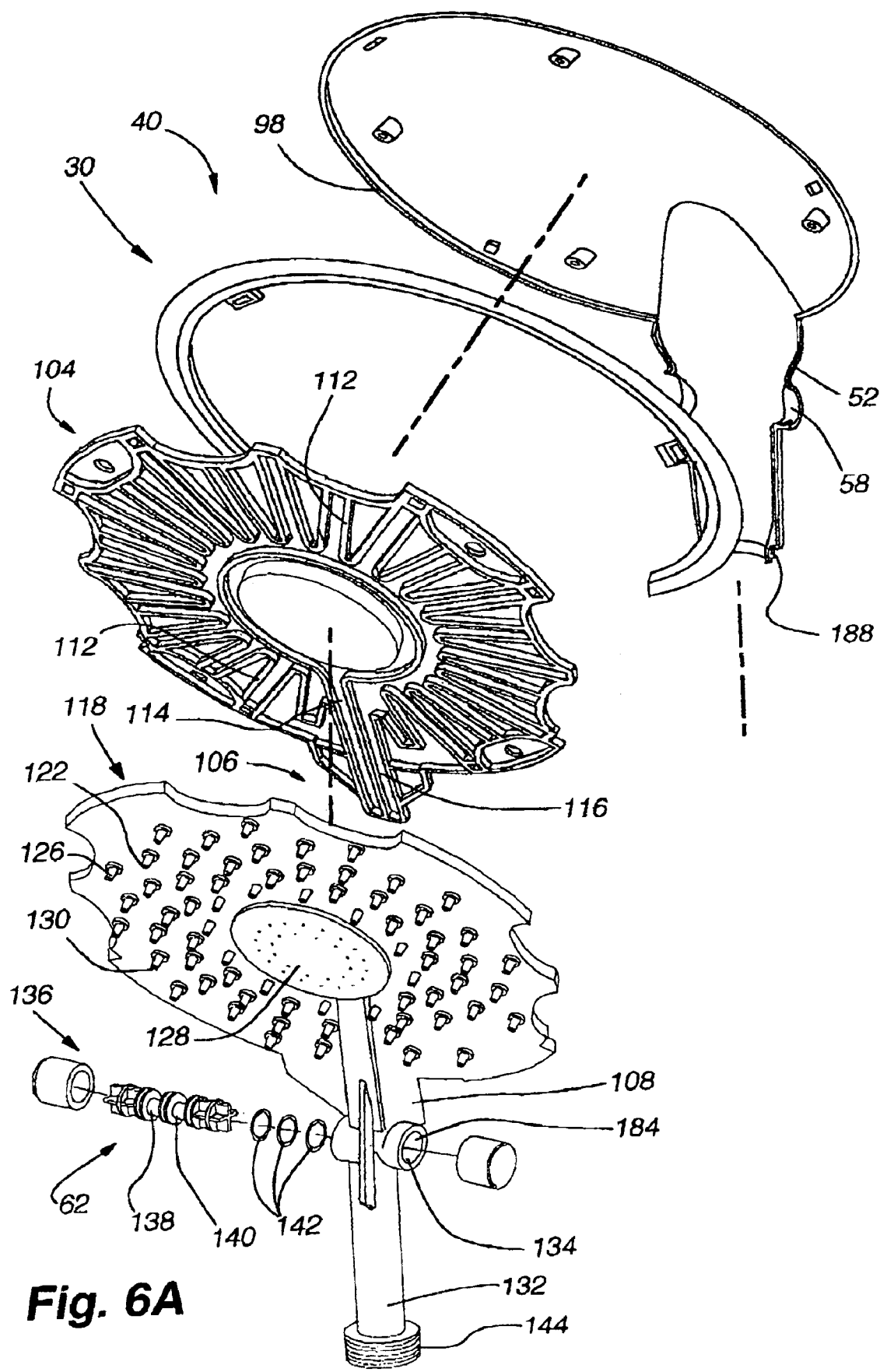
FIGS. 6A–B are an exploded view of the embodiment depicted in FIG. 1 of the shower head of one embodiment of the present invention.
Figure 6B:
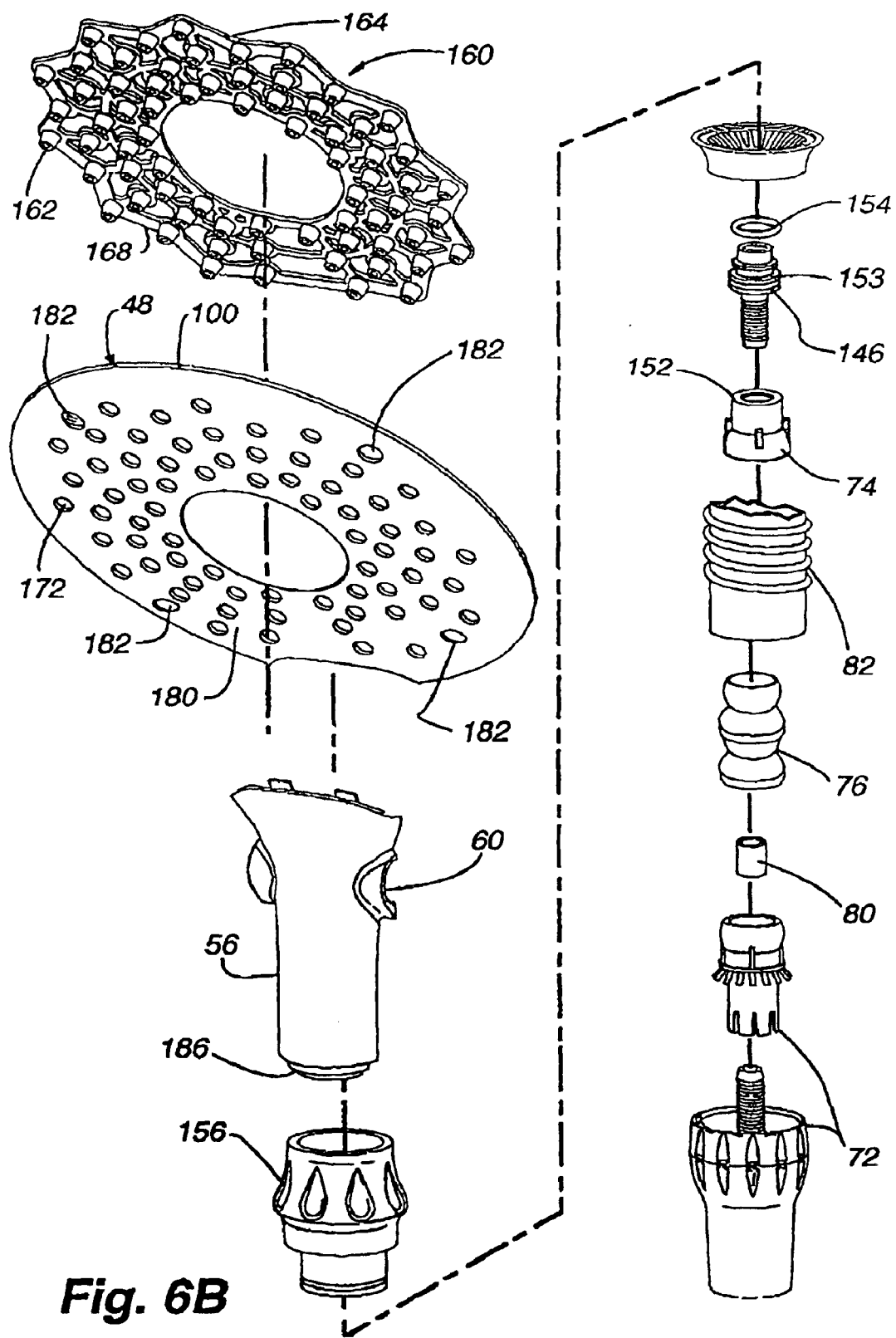

FIGS. 6A–B are an exploded view of a shower head assembly 30 according to one embodiment of the present invention. As shown in FIGS. 6A–B, the shower head assembly 30 is constructed using several layers of elements. Starting from the top of the shower head 40, the first layer is the upper portion 44 of the outer housing 42 of the shower head 40. The upper portion 44 has a shallow dome-shaped top and an elongated portion 52. The elongated end 52 of the upper shell portion 44 is adapted to receive an o-ring. On the underside of the elongated portion 52 of the upper shell is a notch 58 that enables access to a means 62 for controlling the level of flow of water exiting the shower head 40, such as a spool valve. The top of the upper shell portion 44 is a substantially circular or oval dome-like structure. The underside 98 of the dome-like structure is flat for connecting to the matching flat portion 100 of the lower shell portion 48, however, this need not necessarily be the case so long as it matches the lower shell portion 48 described below.

In one embodiment of the shower head assembly 30, the head portion of the upper shell portion 44 and lower shell portion 48 are connected together using a detent-type structure or connection ring 102. The connector ring 102 includes a groove 103 on the top and bottom which correspond to the outermost edges of the flat portions 98, 100 of the upper and lower shells. The connector ring 102 provides for a uniform connection between the upper 44 and lower housing 48 and helps hold the outer housing together. In other embodiments the head portion of the upper 44 and lower shell 48 portions can be connected using any other means including adhesives and welds.

Moving from top to bottom in FIG. 6, the next layer is the inner nozzle cover 104. The inner nozzle cover 104 is contained within the upper 44 and lower shell portions 48 and is generally not visible from the exterior of the shower head 40 when assembled. The inner nozzle cover is substantially the same shape as the head portion 44 of the shower head 40—e.g., substantially round or oval. The inner nozzle cover 104 includes a cap portion 106 extending from the portion of the inner nozzle cover 104 adjacent to the notched portion 58 on the underside of the upper shell portion. The cap portion 106 covers a water supply conduit 108 formed in the inner nozzle layer 118 described below to define a water supply channel 110.

FIG. 7 shows a bottom view of an exemplary design for the inner nozzle cover 104. The inner nozzle cover preferably has at least one wall 112 extending downwardly from the bottom surface of the inner nozzle cover 104. This wall 112 forms at least two water channels 114, 116. The inner nozzle cover 104 and the inner nozzle layer 118 are connected to form the channel and distribution system for the water, generally 110, and specifically 114, 116. The inner nozzle cover 104 and the inner nozzle layer 118 are preferably connected using a hotplate weld, but can be connected using any other means capable of withstanding the shower head operating pressures (e.g., adhesives or other weld means). The channels 114, 116 are formed in a pressure vessel defined by the inner nozzle cover 104 and inner nozzle layer 118 and act to decrease the overall water pressure flowing through the inner nozzles by reducing the area of the water flow.

In one embodiment, the wall 112 disposed between the inner nozzle layer 118 and the inner nozzle cover 104 extends down from the inner nozzle cover 104 and meets with the upper portion 120 of the inner nozzle layer 118. The inner nozzle layer 118 typically has a corresponding structure designed to mate with the downwardly extending wall 112 of the nozzle cover 104. This structure may be a similar wall structure, or a seat to receive the downward extending wall from the inner nozzle cover.

As shown in FIG. 7, the wall 112 defines a first 114 and second 116 water channel. The first channel 114 diverts the water flow to the center of the shower head 40. The second water channel 116 distributes the water flow to the nozzles located toward the outside of the shower head in a roughly star-shaped pattern. The nozzle layout and type is dependant on the particular implementation.

Referring back to FIG. 6A, underneath and connected to the inner nozzle cover 104 is the inner nozzle layer 118. The inner nozzle layer 118 is also contained within the outer housing 42 when assembled. In an alternative embodiment, a portion of the nozzles 122 of the inner nozzle layer 118 extend below the lower apertured portion 48. Preferably, the inner nozzle layer 118 is constructed of a material capable of withstanding the operating water pressures of the shower head 40. The inner nozzle layer 118 is substantially the same shape as the inner nozzle cover 104, e.g., substantially round or oval. The bottom portion 124 of the inner nozzle layer 118 is apertured and includes at least one conical or frusto-conical nozzle 122 extending downward from the aperture 126 and decreasing in diameter (see FIG. 12). In one embodiment, the bottom portion 124 of the inner nozzle layer 118 includes sets of apertures 126 and nozzles 122 that are grouped based on their type of flow. In one embodiment, a fine mist water flow flows through a first set of nozzles 128, while turbulent flow flows through the second set 130.

A water supply conduit 108 is formed at the portion of the inner nozzle layer 110 adjacent to the notch 58 in the upper shell portion 44 (See FIG. 8). The water supply conduit 108 angles downwardly into the stem 46 of the outer housing 42 and connects to the water supply line at a location preferably within the stem 46. The throat 132 of the water supply conduit 108 includes a tunnel-like valve receiving chamber 134 that extends through the conduit 108 and is perpendicular to both the conduit 108 and the stem 46. The spool valve 136 is of generally cylindrical shape and has two annular openings 138, 140. Three o-rings 142 separate the annular openings 138, 140 and provide a seal between the annular openings 138, 140 and the ends of the spool valve 136 within the chamber 134. The spool valve 136 resides in the receiving chamber 134 and both ends of the spool valve 136 extend from the holes defined by the notches 58, 60 in both the upper 44 and lower 56 shell portions.

Below the valve receiving chamber 134 is a threaded annular recess 144 in the sidewalls of the conduit 108. The annular recess 144 receives and holds the end of the hose grommet 146 attached to the water supply hose 80 and attaches to the outer sleeve 82 (See FIG. 6B).

FIG. 8 shows a top view of the inner nozzle layer 118 having a wall 148 extending upwardly from the top surface of the layer 118. This wall 148 preferably corresponds to the wall 112 shown in FIG. 7. The wall 148 defines a first 114 and a second 116 water channel. As can be seen from FIG. 8, the conduit 108 is divided into channels by a vertical wall 148 matching that shown in FIG. 7. In one embodiment, two channels 114, 116 exist for directing the supply water to either the first set of nozzles 128 or the second set of nozzles 130. However, in other embodiments, additional channels may be defined for various types of water flow. Water supply holes 150 are formed in the valve receiving chamber 134, and allow the supply water to enter the water supply channels 114, 116. There is a water supply hole 150 for each existing water supply channel 114, 116 in one example. The spool valve 136, shown in FIG. 6, when inserted into the valve receiving chamber 134, is used to control which water supply hole 150 the supply water enters. The spool valve 136 includes o-rings 142 and can effectively seal off one or more of the water supply holes 150 by pushing on either side of the spool valve 136. For instance, if a user wants the water to only flow into the water supply holes 150 that supply water to the first set of nozzles 128, the user may adjust the spool valve to a first position. In the first position, the second annular opening 140 in the spool value is aligned with the water supply hole 150 in the first water channel 114. However, if the user wants the water to only flow into the water supply holes 150 that supply water to the second set of nozzles 130, the user may adjust the spool valve 136 to a second position by pushing on the other side of the spool valve 136. In the second position, the first annular opening 138 of the spool valve is aligned with the water supply hole 150 that supplies the second water channel 116. The first set of nozzles 128 in the center of the shower head are preferably fine mist nozzles. The second set of nozzles 130 within the second water channel 116 are preferably different than the fine mist nozzles, such as turbulent flow nozzles.

Referring to FIGS. 6A–B, the inner nozzle layer 118 is connected to the water supply by a hose grommet 146 connected to the bottom end of the water conduit 108. The hose grommet 146 extends through a snap-in part 152 and into a water supply hose 80. The snap-in part 152, snaps into the bottom end of the water conduit. The hose grommet 146 also has an o-ring 158, which serves to seal the water supply hose 80 within the bottom end of the water conduit 108. The water supply hose 80 extends down the stem 46 of the shell and is connected to a water supply pipe or shower arm 64. A collar 154 and a stem connection piece 156 connect the sleeve 82 to the outer housing 42 and facilitate holding the outer housing together.

Figure 9:
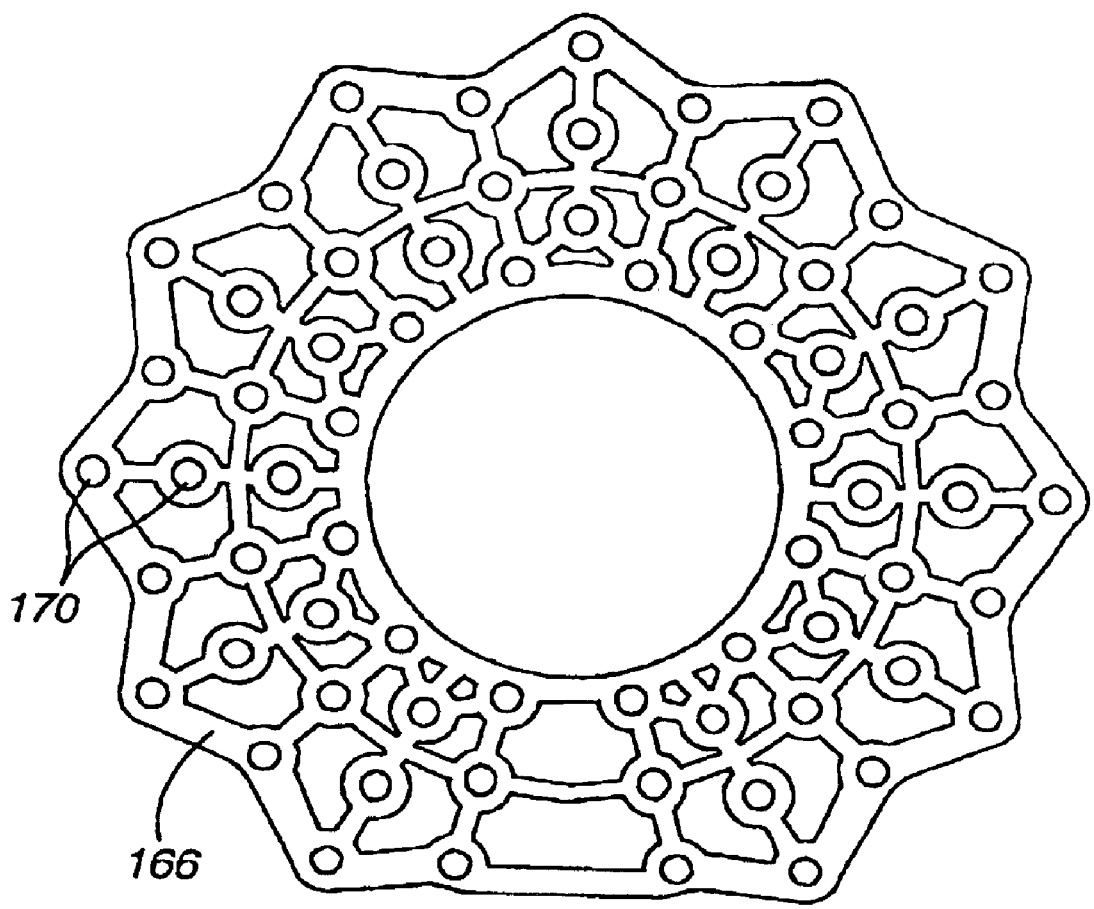
FIG. 9 is a top view of an external nozzle layer having a plurality of external nozzles connected by a web in accordance with one embodiment of the present invention.

Below the inner nozzle layer 118 is an external nozzle layer 160 (shown in FIG. 6B) having a plurality of external nozzles 162. In one example, the plurality of external nozzles 162 are joined through a web 164, so that all of the nozzles 162 can be assembled to the rigid nozzle layer 118 in one piece. FIG. 9 shows a top plan view of an embodiment of the external nozzle layer 160 in accordance with the present invention having a plurality of external nozzles 162 connected via a web 164 of the same material the external nozzles 162 are fabricated from. The external nozzle layer 160 is preferably formed from a soft, flexible material that can be manipulated by a user (e.g., rubber or plastic). The external rubber nozzle layer 160 is shaped substantially the same as the apertured portion of the rigid nozzle layer 118. The top side 166 of the external rubber nozzle layer 160 is apertured 170 and the bottom side 168 of each aperture 170 includes rubber nozzles 162 extending therefrom. The pattern of apertures 170 and nozzles 162 in the external nozzle layer 160 is matched with the pattern of apertures and nozzles 122 in the inner nozzle layer 118. The inner nozzles 122 extend into, and nest within, the external nozzle layer apertures 170 and reside partially within the external nozzle layer nozzles 162. The nozzles 162 of the external nozzle layer 160 extend downwardly through corresponding apertures 172 formed in the lower shell portion 48 and reside external to the shower head outer housing 42. In an alternative embodiment, a portion of the inner nozzle 122 also extends downwardly through corresponding apertures 172 in the lower shell portion 48.

Figure 10:
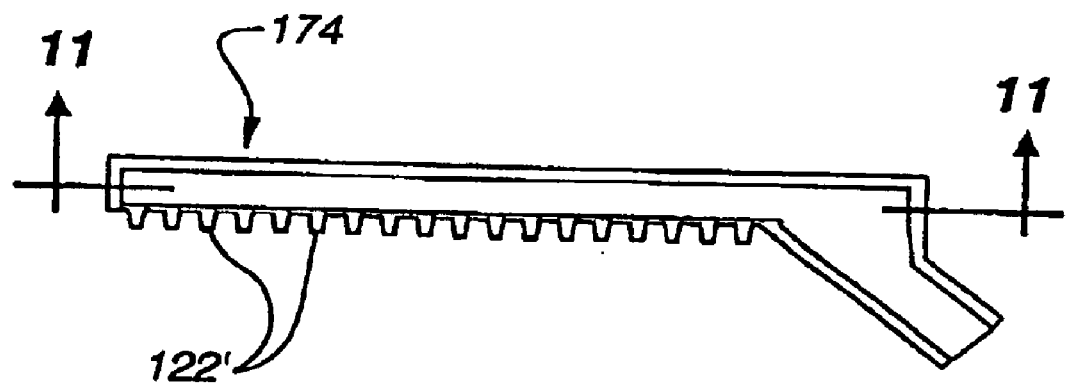
FIG. 10 is a side view of an inner nozzle insert in accordance with another embodiment of the present invention.

In another embodiment, an inner nozzle insert 174 is provided. A section view of an inner nozzle insert 174 according to one embodiment of the present invention is shown in FIG. 10. The inner nozzle insert 174 is also enclosed by the outer housing 42 when assembled. The inner nozzle insert 174 has a top 176 and bottom 178 portion. The bottom portion 178 includes a plurality of inner nozzles 122. The inner nozzles 122 may be one consistent type of nozzle or any combination of nozzles yielding various types of water flow as described above. The inner nozzle insert 174 can have multiple water channels for distribution of water to various groups of inner nozzles 122 or alternatively can have only one water distribution channel. The insert can be easily manufactured through known processes such as injection molding. In the embodiment having only one water distribution channel, there is no need for a valve to divert the flow of water from the arm assembly to the various nozzles. However, if desired, a valve can be included to temporarily slow the flow of water to the inner nozzles to a drip.

Figure 11:
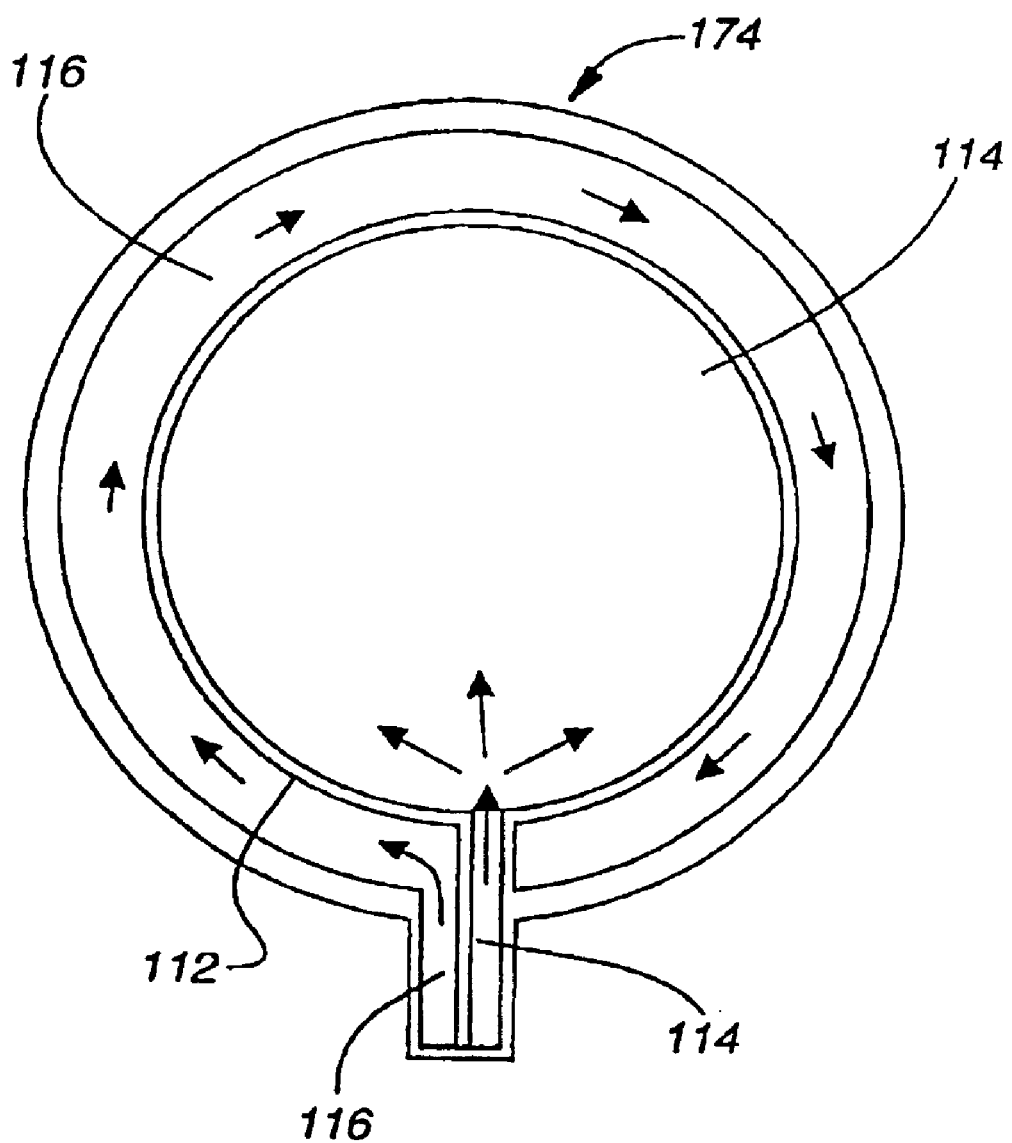
FIG. 11 is a section view of the rigid nozzle insert shown in FIG. 10 taken through section 11—11.

FIG. 11 is a section view of the rigid nozzle insert taken along section lines 11—11 of FIG. 10. This section view shows the wall assembly 112 that defines at least two water channels 114, 116 as discussed above. As shown in FIG. 11, a wall 112 is disposed between the top layer 176 and bottom layer 178 of the inner nozzle insert 174. The wall 112 defines a first water channel 114 and a second water channel 116. The flow of water preferably is directed to either the first 114 or second 116 water channel by adjusting the spool valve 136. This configuration is only one example showing the use of a wall 112 defining two separate water channels. A variety of configurations creating multiple water channels distributing the flow of water in numerous ways will be readily appreciated by one of ordinary skill in the art.

An alternative design is to use a separate and independent external nozzle 162 for each inner nozzle 122. A further alternative is to mold the external nozzle 162 onto the rigid nozzle 122 using a two step molding technique whereby a water channel 174 is first molded using a rigid material and the external nozzle 162 is formed onto the water channel using an injection mold. This alternative has a more expensive tooling cost, but results in a stronger bond between the two materials and lowers assembly costs. Another alternative is to first mold the rigid cosmetic cover 48 and second mold the external nozzle 162 onto the cosmetic cover 48 using an injection mold. The cosmetic cover 48 can then be fastened or adhered to the inner nozzle layer 118 using mechanical fasteners or adhesives. Both the inner nozzle layer 118 and the cosmetic cover 48 may be constructed of ABS plastic or a similar rigid plastic material.

Referring back to FIGS. 6A–B, the lower apertured portion 48 resides below the external nozzle layer 160, or insert 174, and includes apertures 172 that correspond to the nozzles 162 in the external nozzle layer 160. The apertures 172 are sized to allow the external nozzles 162 to extend through the lower shell portion 48. The apertured portion of the lower shell portion 48 is relatively flat around the perimeter 100, corresponding with the flat perimeter portion 98 of the upper shell portion 44. The perimeters are connected via a connector ring 102 as discussed above. The bottom side 180 of the lower shell forms a rigid cosmetic cover 48 for protecting the internal elements of the shower head. The lower shell portion 48 may include detents or recesses 182 to correspond with detents/recesses in the upper shell portion 44. The lower shell portion 48 also includes an angled elongated stem portion 56 that corresponds with the stem portion 52 of the upper shell portion 44. The angled elongated stem portion 56 also includes a notch 60 that corresponds with the notch 53 in the upper shell portion 52 to define a hole 184 in the stem portion 46 of the shell 42. The bottom end 186 of the stem portion 56 is adapted to receive an o-ring similar to the upper portion 188. An o-ring (not shown) is used to help hold the upper and lower shell portions together.

FIG. 12 is an enlarged section view of a shower head nozzle assembly 190 according to one embodiment of the present invention. Each nozzle assembly 190 includes an inner nozzle 192 and an external nozzle 194. The inner nozzle 192 is preferably nested within the external nozzle 194. Each nozzle 192, 194 has an upper 196, 198 and a lower 200, 202 portion. The lower portion 200, 202 of the each nozzle ends in a nozzle tip, or orifice 204, 206. The nozzles 192, 194 are nested such that a void space 200 is defined within the external nozzle 194 between the tips 204, 206 of the external nozzle 194 and the inner nozzle 192.

The inner nozzle 192 has a nozzle reservoir 210 as well as a nozzle cavity 212 defining an upper portion 196 which tapers down to the lower portion 200. The lower portion 200 terminates at an inner nozzle orifice 204. The inner nozzle orifice 204 preferably has a smaller cross-sectional surface area compared to the upper portion 196 of the nozzle cavity 212.

The external nozzle 194 has an upper portion 198 and a lower portion 202. The lower portion 202 terminates in an external nozzle orifice 206. The external nozzle 194 is sized to allow the inner nozzle 192 to nest within the inner portion 212 of the external nozzle 192. The upper portion 198 of the external nozzle 192 also has a seal or flange 214 extending radially outward from the center of the external nozzle 192.

As illustrated in FIG. 12, water 216 from a water supply channel 114, 116 enters the enlarged nozzle reservoir portion 210 of the inner nozzle 192 and flows downwardly into the frusto-conical nozzle cavity 212 of the inner nozzle 210, through the lower portion 200 of the inner nozzle 192, and exits the nozzle structure through an external nozzle orifice 204.

Such a nozzle assembly may provide precise directional control of the water stream 216 which in turn provides clean, crisp water streams that are directed in a conical or other pattern. To facilitate the precise directional control of the water stream 216, the inner nozzle 192 is preferably a rigid nozzle. The external nozzle 194 is preferably a flexible, rubber-type nozzle. The external nozzle orifice 206 is also preferably a larger diameter than the inner nozzle orifice diameter 204 so as not to interfere with the precise flow stream created by the inner nozzle 192. However, it is also contemplated that the outer nozzle 194 is made from a material of such flexibility that it would not affect the flow pattern of the water stream 216 exiting the inner nozzle 192 regardless of diameter.

While the inner nozzle 192 is preferably rigid, it is also contemplated that the inner nozzle 192 can be a flexible material, similar to the external nozzle 194. Due to the fact that the inner nozzle 192 is nested within the outer nozzle 194, the portion of the external nozzle 194 that is in contact with the inner nozzle 192 serves to add additional support to the inner nozzle 192 by increasing the effective thickness of the inner nozzle 192.

The material for the external nozzle 194 is selected so that the nozzle is flexible enough to yield during cleaning. Suitable materials include soft elastomeric materials such as santoprene, and monoprene having a Shore A hardness of 40–50. When shower heads 40 are used in areas where a high concentration of calcium exists in the water supply, it has been found the water dries on the outer most edge of the nozzle and forms a deposit 218. Over time, this deposit 218 can build up into a hard formation that impedes the water stream and adversely affects the performance of the shower head 40. The cleaning procedure for the flexible nozzle 194 is to rub the flexible nozzle 194 with a finger 220 or cleaning rag and effectively break apart any hard residue 218 that has dried on the nozzle (see FIGS. 14 and 15).

The preferred material for the external nozzle 194 is typically a low durometer rubber that often results in a high amount of flash from molding. In one embodiment, the inside diameter of the external nozzle 194 can tolerate a relatively larger amount of flash than can be tolerated on the orifice 206 and still give excellent performance.

The materials selected for the inner nozzle 192 are preferably materials with a high degree of moldability, where the flash obtained as a result of the molding process is kept to a minimum at the orifice. Suitable materials include ABS plastic, Norel®, or any other thermoplastic known to those is the art.

The geometry of both the inner nozzle 192 and the external nozzle 194 along with the water pressure help determine the type of water flow experienced by the user (e.g. fine mist or turbulent). Myriad nozzle structures are possible so long as they are designed to handle the corresponding water pressures. A preferred nozzle assembly 190 is one that provides a drenching rain-like experience. This type of nozzle assembly 190 is constructed by creating a nozzle 192 with less taper and a larger nozzle orifice 204. The nozzle orifice 204 can also be decreased to provide a higher velocity, piercing type stream of water.

As seen in FIG. 13, lime and calcium deposits 218 from mineral-laden supply water build up inside the end of the external nozzle 194 within the void space 208. Such a build-up can impede the supply water thereby disrupting the designed flow quality. It has been found by the present inventors that mineral deposits 218, such as lime and calcium deposits, form at the lower most portion of a shower nozzle 190. In this case, the structure of the corresponding inner 192 and external 194 nozzles facilitates formation of any mineral deposits 218 at the end of the external nozzle 194 and in the void space 208 between the lower portion 200 of the inner nozzle 192 and the lower portion 202 of the external nozzle 194. Thus, embodiments of the present invention provide the dual benefit of a means for accurate and precise directional control of water streams while simultaneously providing the ability to quickly and easily remove any mineral deposits 218 from the shower head 40 which may effect the performance of the shower head assembly 30. This means can be, among other things, a nozzle, a projecting vent or projecting spout, or a fluid focusing device.

As shown in FIGS. 14 and 15, by manipulating the external rubber nozzle 194 with a finger 220, the user can cause the lime and calcium deposits 218 to be dislodged from the interior of the external rubber nozzle 194 thereby restoring the flow 216 from the rubber nozzle 194 to its designed flow quality.

In the event that a rigid cosmetic cover 48 is selected for use in the shower head as described above, the inner nozzle 192 presses downwardly into the external nozzle 194, or external nozzle layer 160 and the rigid cosmetic cover 48 presses upwardly against the bottom side 168 of the external nozzle 194. The external nozzle 194 thus acts as a means for sealing the apertures 172 of the outer housing and for removing mineral deposits 218 by preventing supply water 216 from exiting the shower head 40 through any means other than the rigid nozzle orifice 204 and the external nozzle orifice 206. The external nozzle 194 thereby serves two purposes; keeping any water from leaking through the apertures 172, and providing a flexible orifice 206 for build-up of mineral deposits 218 which can be easily manipulated for removal. Other means for sealing the apertures 172 of the outer housing can include, among other things, a flange, a web, an o-ring or a gasket.

The upper 44 and lower shell 48 portions of the outer housing 42 when connected together hold the nozzle structure 190 together with sufficient pressure on the nozzle structure 190 to further effectuate the sealing action of the external rubber nozzle 194. When properly held in place, the external nozzle 194 extends downwardly through an aperture 172 in the rigid cosmetic cover 48 of the lower shell portion. The user is able to manipulate the external rubber nozzles 194 with a finger 220 to clear any lime and calcium deposits 218 that may accrue within the void space 208 or exterior of the external nozzle 194.

In accordance with another embodiment of the present invention, the enlarged shower head 40 is provided with a first set of nozzles 128 and a second set of nozzles 130 each providing a different flow stream, or pattern. The configuration of the shower head is such that a plurality of water channels 114, 116 are formed within the housing 42 of the shower head 40 as described with respect to FIGS. 7, 8 and 11 above. The water channels 114, 116 are configured to deliver the flow of water to the first set of nozzles 128 or the second set of nozzles 130. The shower head also may have a means 62 for directing the flow of water from the water supply pipe or shower arm 64 to either the first set of nozzles 128, second set of nozzles 130, or both. One example of this means for directing flow is the spool valve 136. Additional sets of nozzles can be added to provide for additional flow streams.

According to another embodiment of the present invention, an enlarged shower head 40 is particularly useful when used in conjunction with a flexible shower arm assembly 64 because of the shower head's shallow profile and lightweight materials. Conventional shower heads with larger diameters are often too heavy to be supported by adjustable arm assemblies. In one example, the total weight of the assembled shower head is lightweight, often less than 2 pounds, and even less than 1.5 pounds. The structure of the shower head 40 also decreases the amount of water contained within the shower head during operation, thereby decreasing the total weight of the shower head during use. This allows for the use of an enlarged shower head 40 in combination with a flexible arm assembly 64. The water channels 114, 116 of the shower head are designed to have shallow openings between the top and bottom portions of the channels. The height of the water channels is preferably less than 0.25 inches. More preferably, the distance between the water channels is between 0.24 inches and 0.18 inches. The shape of the channels is generally rectangular and the height of the channels is preferably less than the width.

Figure 16:
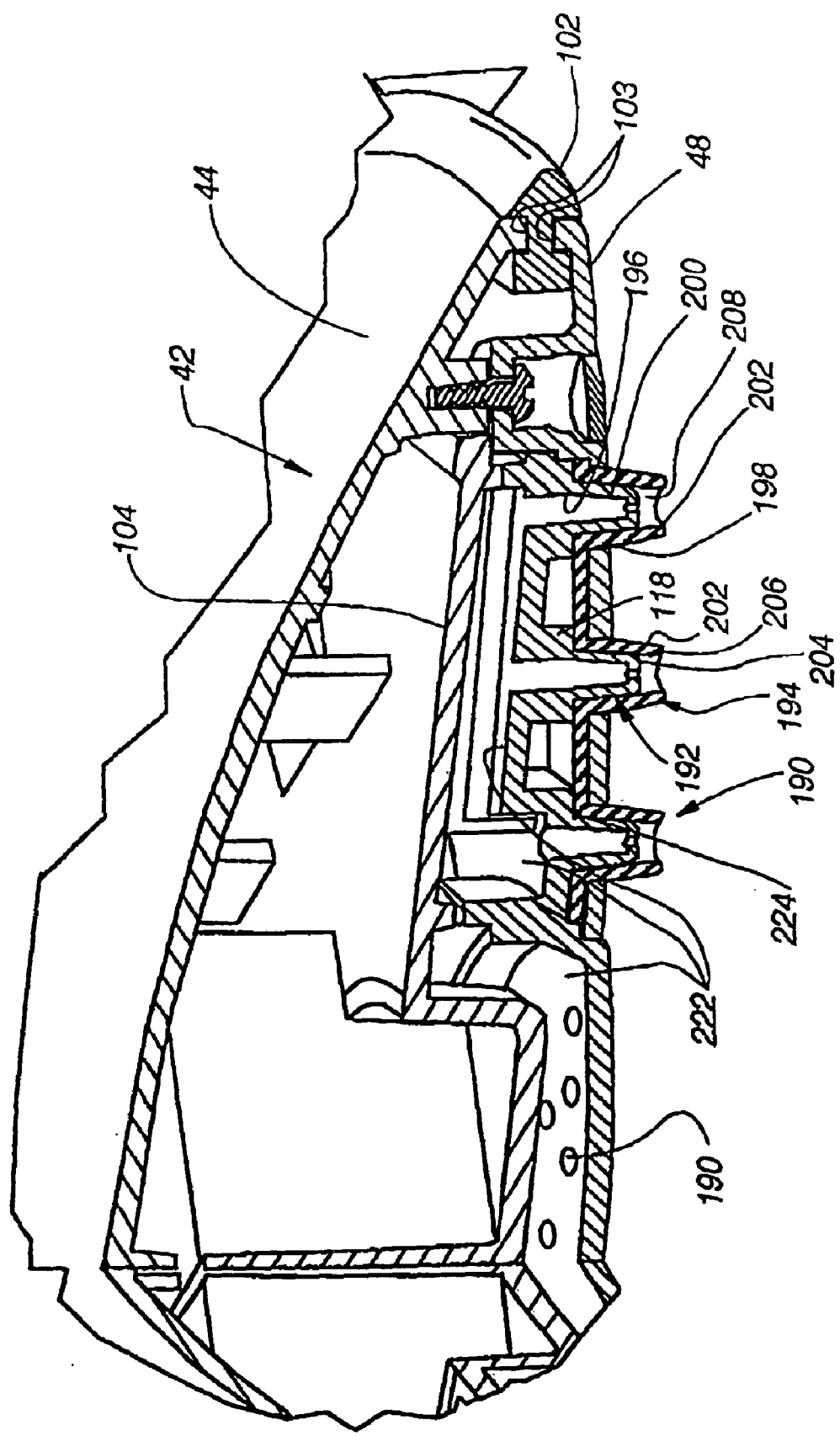
FIG. 16 is a section view of an assembled shower head taken through the nozzles.

FIG. 16 illustrates a cross sectional view of an assembled shower head 40 according to one embodiment of the present invention. The rigid nozzle cover 104 and the rigid nozzle layer 118 form the channel and distribution system for the water. These two parts 104, 118 are preferably composed of rigid plastic and hot plate welded together. The water flows through the inlet channel and into a plurality of distribution channels 222. The channels 222 are sized so that there is little flow restriction with respect to the exit orifice to give equal flow through every nozzle assembly 190. The water is channeled through a taper 224 prior to exiting the nozzle assembly 190. The precise configuration of the taper 224 and nozzle may be changed for various applications, for example to direct the water in a certain pattern and to regulate the velocity and flow of the water stream.

Although embodiments of the present invention have been described with a certain degree of particularity, it is understood that the present disclosure has been made by way of example, and changes in detail or structure may be made without departing from the spirit of the invention as defined in the appended claims.

What is claimed is:

1. A water supply channel assembly, comprising:
   a first water supply channel comprising:
      a first flow path; and
      a first group of apertures;
   a second water supply channel comprising;
      a second flow path; and
      a second group of apertures; and
   a first wall defining a commonly-shared sidewall of the first and second water supplies; wherein
   the second flow path comprises a plurality of radially-extending flow channels.

2. The water supply channel assembly of claim 1, wherein the second water supply channel at least partially surrounds the first water supply channel.

3. The water supply channel assembly of claim 1, wherein:
   the first flow path comprises a straight laminar flow path; and
   the second flow path comprises an at least partially circular turbulent flow path.

4. The water supply channel assembly of claim 3, wherein each of the plurality of radially-extending flow channels extend substantially directly outwardly from the at least partially circular turbulent flow path.

5. The water supply channel assembly of claim 4, further comprising a second wall defining:
   at least one sidewall of the plurality of radially-extending flow channels; and
   at least one sidewall of the second flow path.

6. The water supply channel of claim 3, further comprising:
   an inner nozzle cover comprising a top of the first and second flow paths; and
   an inner nozzle layer comprising a base of the first and second flow paths, the inner nozzle layer mating with the inner nozzle cover; wherein
   the wall extends outwardly from the inner nozzle cover; and
   the first and second groups of apertures are formed in the inner nozzle layer.

7. The water supply channel of claim 3, further comprising a valve operative to direct water flow to one of the first and second flow paths.

8. The water supply channel of claim 7, further comprising a unitary inner nozzle insert defining a top and a bottom for the first and second flow paths; wherein
   the first wall is formed integrally in the unitary inner nozzle insert.

9. The water supply channel of claim 3, further comprising a valve operative to regulate a flow speed of a liquid through the first and second flow paths.

* * * * *